(12) United States Patent
Viel et al.

(10) Patent No.: US 10,717,834 B2
(45) Date of Patent: Jul. 21, 2020

(54) SWELLABLE AND INSOLUBLE NANOFIBERS AND USE THEREOF IN THE TREATMENT OF ESSENTIALLY AQUEOUS EFFLUENTS

(71) Applicants: COMMISSARIAT A L'ENERGIE ATOMIQUE ET AUX ENERGIES ALTERNATIVES, Paris (FR); AJELIS, Orsay (FR)

(72) Inventors: Pascal Viel, Meudon (FR); Marvin Benzaqui, Paris (FR); Ekaterine Shilova, Marseilles (FR)

(73) Assignees: COMMISSARIAT A L'ENERGIE ATOMIQUE ET AUX ENERGIES ALTERNATIVES, Paris (FR); AJELIS, Orsay (FR)

( * ) Notice: Subject to any disclaimer, the term of this patent is extended or adjusted under 35 U.S.C. 154(b) by 246 days.

(21) Appl. No.: 15/750,044

(22) PCT Filed: Aug. 4, 2016

(86) PCT No.: PCT/EP2016/068626
§ 371 (c)(1),
(2) Date: Feb. 2, 2018

(87) PCT Pub. No.: WO2017/021484
PCT Pub. Date: Feb. 9, 2017

(65) Prior Publication Data
US 2018/0215882 A1    Aug. 2, 2018

(30) Foreign Application Priority Data

Aug. 5, 2015 (FR) .................................... 15 57570
Oct. 7, 2015 (FR) .................................... 15 59537

(51) Int. Cl.
C08J 5/22     (2006.01)
C02F 1/44     (2006.01)
(Continued)

(52) U.S. Cl.
CPC ........ C08J 5/2231 (2013.01); B01D 67/0002 (2013.01); B01D 71/44 (2013.01);
(Continued)

(58) Field of Classification Search
CPC .. A01N 59/16; B01D 2239/025; B01D 39/18; B01D 2323/39; B01D 2239/0631;
(Continued)

(56) References Cited

U.S. PATENT DOCUMENTS 7,662,332 B2 * 2/2010 Chu ..................... D01D 5/0069
                                                            264/465
9,511,329 B2 * 12/2016 Chu ................... B01D 39/1615
(Continued)

OTHER PUBLICATIONS

International Search Report from International Patent Application No. PCT/EP2016/068626 dated Nov. 17, 2016.
(Continued)

Primary Examiner — Ana M Fortuna
(74) Attorney, Agent, or Firm — Greer, Burns & Crain, Ltd.

(57) ABSTRACT

Nanofibres are provided that are insoluble and swellable in an essentially aqueous effluent, a method for the preparation of these nanofibres and the use of these nanofibres for the extraction from an effluent of metals, in particular metal salts originating from heavy metals, of rare earths, alkali metals, alkaline earth metals or actinides, in the stable or unstable isotopic forms thereof.

21 Claims, 8 Drawing Sheets

(51) Int. Cl.
| | |
|---|---|
| B01J 20/28 | (2006.01) |
| B01J 20/26 | (2006.01) |
| C02F 1/28 | (2006.01) |
| C02F 1/62 | (2006.01) |
| B01D 67/00 | (2006.01) |
| B01D 71/44 | (2006.01) |
| B01J 39/04 | (2017.01) |
| B01J 39/20 | (2006.01) |
| D01F 1/10 | (2006.01) |
| D01F 6/16 | (2006.01) |
| C02F 101/00 | (2006.01) |
| C02F 101/20 | (2006.01) |
| C02F 103/16 | (2006.01) |
| C02F 103/34 | (2006.01) |
| C02F 101/10 | (2006.01) |

(52) U.S. Cl.
CPC ....... *B01J 20/267* (2013.01); *B01J 20/28038* (2013.01); *B01J 39/04* (2013.01); *B01J 39/20* (2013.01); *C02F 1/285* (2013.01); *C02F 1/288* (2013.01); *C02F 1/44* (2013.01); *C02F 1/62* (2013.01); *D01F 1/10* (2013.01); *D01F 6/16* (2013.01); *C02F 2101/006* (2013.01); *C02F 2101/10* (2013.01); *C02F 2101/20* (2013.01); *C02F 2103/16* (2013.01); *C02F 2103/346* (2013.01); *C02F 2303/16* (2013.01); *C02F 2305/08* (2013.01); *C08J 2333/02* (2013.01); *Y02W 10/37* (2015.05)

(58) Field of Classification Search
CPC .. B01D 39/2017; C02F 1/444; C02F 2101/20; C02F 1/285; C02F 1/62; C02F 2303/16; B01J 20/267; C08J 2333/02
See application file for complete search history.

(56) References Cited

U.S. PATENT DOCUMENTS

| | | | |
|---|---|---|---|
| 2006/0068668 A1* | 3/2006 | Kameoka | B01D 39/163 442/340 |
| 2008/0149561 A1* | 6/2008 | Chu | A61L 15/425 210/500.38 |
| 2011/0198282 A1* | 8/2011 | Chu | B01D 39/1615 210/500.29 |
| 2013/0180917 A1* | 7/2013 | Chu | A61K 31/74 210/634 |
| 2015/0292117 A1 | 10/2015 | Daniel et al. | |

OTHER PUBLICATIONS

Written Opinion from International Patent Application No. PCT/EP2016/068626 dated Nov. 17, 2016.

* cited by examiner

Figure 2
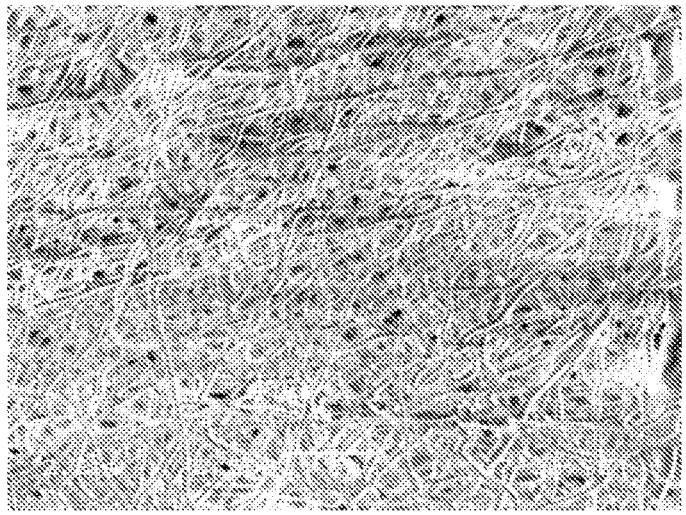
Figure 3a
Figure 3c
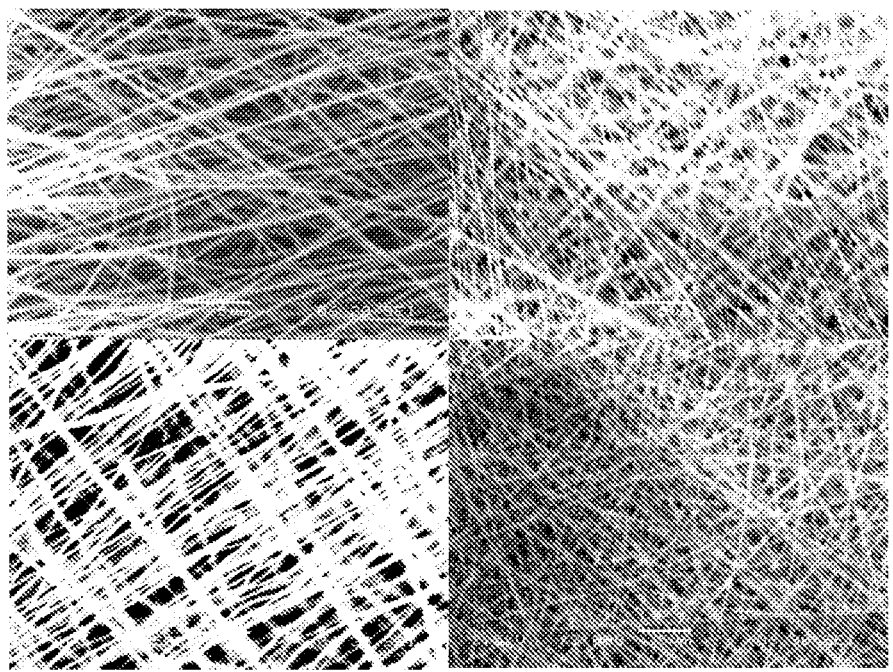
Figure 3b
Figure 3d

Figure 8a
Figure 8b
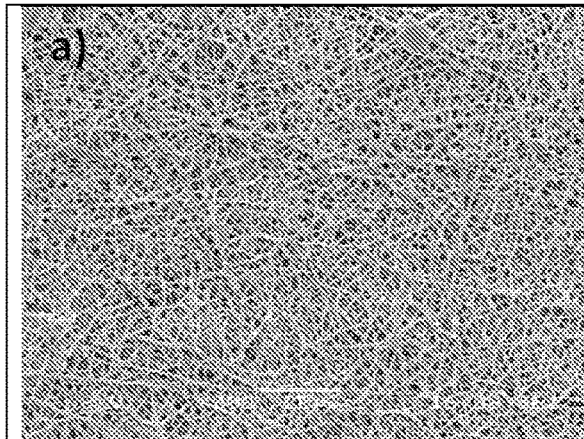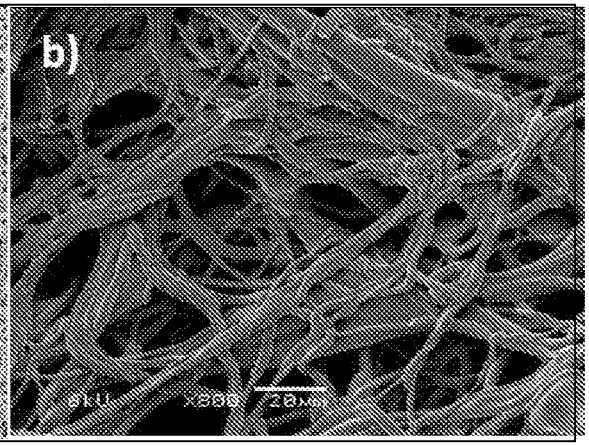

SWELLABLE AND INSOLUBLE NANOFIBERS AND USE THEREOF IN THE TREATMENT OF ESSENTIALLY AQUEOUS EFFLUENTS

BACKGROUND

The present invention relates to polymer nanofibres that are swellable and insoluble in an essentially aqueous effluent and use thereof in the treatment of these effluents.

The pollution of water by heavy metals has been an increasing environmental problem over the last few decades, requiring immediate and urgent action.

Heavy metals, such as Zn, Co, Fe, Cr and Cu, are widely used in the surface treatment industry, in connection with the automotive sector or microelectronics, for the implementation of electroplating, electroless or electrogalvanizing processes. Despite technical advances, the liquid effluents discharged by these industries inevitably always contain traces of heavy metals, mainly in the form of salts, which are dangerous to public health and the environment and require treatment before being discharged into the environment.

The European standards regulating the levels of the different elements discharged are now becoming increasingly strict. In the case of heavy metals such as copper, the discharge authorization threshold for the standard effluents has been reduced from 2 mg/L in 1985 to less than 0.5 mg/L since 1998, when the daily discharge quantity exceeded 5 g/day.

The nuclear industry also needs to address the issue of the treatment of liquid effluents contaminated with radioactive elements, which can be produced during decontamination operations or in the event of accidents. For example, the Fukushima disaster made vast quantities of seawater radioactive due to the presence of radioactive caesium. This resulted in thousands of cubic metres of seawater having to be treated in order to remove traces of radioactive caesium. The difficulty is to capture the caesium atoms present in very low concentrations, from $10^{-7}$ to $10^{-12}$ mol·L$^{-1}$, among sodium atoms, which are at least 1000 times more concentrated.

In the case of the rare earths, in addition to concern for public health and the environment, the recovery and separation of these elements from an effluent is also of considerable economic significance. In fact, the rare earths are used in significant quantities in high-technology products and, on account of their strategic nature and supply difficulties, their recycling is becoming very attractive.

Consequently, the treatment of industrial liquid effluents is becoming a major problem in our society. Currently in industry, in particular in the surface treatment, electronic, or nuclear industries, there is a specific demand for novel processes that are cleaner, inexpensive and able to come down to a performance threshold up to ten times lower than the current standards.

Most conventional methods for the treatment of effluents comprise a primary treatment followed by a secondary treatment. The primary treatment implemented by coagulation and/or precipitation makes it possible to remove the different solid pollutants. If this treatment also makes it possible to reduce the metals present in an effluent by 90% to 95%, it does not always make it possible to meet the requirements of the standards. It is necessary to use a secondary treatment in order to further reduce the heavy metals content.

The following conventional methods that can be used for a secondary treatment may be mentioned as examples: ion-exchange resins, membrane filtration, liquid-liquid extraction. Some of these are fairly effective, but unfortunately have inherent limits such as rigorous operating conditions and the production of secondary contaminants.

Ion-exchange resins are widely used for treating effluents containing heavy metals and have numerous advantages: their treatment capacity, a certain metal capture selectivity and their rapid kinetics compared with other, for example membrane, techniques. Most resins are constituted by very small synthetic polymer beads (50-500 µm) between which the effluent passes in order to be decontaminated. The effectiveness of these resins is however limited due to their design. In fact, the vast majority of resins reach only 50% of their exchange capacity due to their manufacture which requires chemical functionalizations that have not taken place at all the potentially accessible sites. On the other hand, the ion-exchange resins are especially effective at their periphery where the exchange can take place rapidly. As diffusion of the liquid in solid phase is very slow, diffusion channels are designed in the manufacture of these resins in order to improve the penetration of the effluent into the core of the resin beads. Nevertheless the diffusion of the liquid deep in the resins is still slowed and this contributes to reducing the useful capacity of the resins. It would be possible to compensate for this problem by drastically reducing the diameter of the beads in order to reduce the surface/volume ratio. However, problems of pressure loss (clogging) and risks presented by their powdery nature will then become apparent.

Another major drawback of this technique is the need to use large quantities of concentrated acids and bases in order to carry out the regeneration operations. It is acknowledged that the regeneration of a kilogram of ion-exchange resins can require the use of more than 50 litres of acids and/or of bases which become secondary effluents. It is important to minimize these secondary effluents.

Another technology developed in the last twenty years consists of using membrane techniques, such as microfiltration, nanofiltration, ultrafiltration and reverse osmosis. However, at present, these techniques are rarely used in the separation of metals, as the membranes can be mechanically fragile and do not have properties of selectivity vis-à-vis metals. Moreover, these techniques consume a great deal of energy.

More recently, natural fibres, such as fibres originating from cotton, fungi, cacti, and waste from food-producing agriculture have been used for the filtration and extraction of metals. The manufacture of these fibres is very cost-effective, but their performance and especially their selectivity remain very modest. For example, the performance of a membrane obtained from a mixture of natural cotton and silk fibres in order to capture copper is only 2.88 mg/g (Ki et al., 2007, *Membrane Sci.*, 302, 20).

The latest technological development consists of using nanofibres, which have micrometric or submicronic diameters and are manufactured either by electrospinning of a polymer solution under high voltage or by application of a centrifugal force (centrifugal spinning) to a polymer solution. However, the industrial use of these nanofibres, often in membrane form, at present remains within the field of tissue engineering or as super-absorbent materials, or also for carrying out mechanical filtration.

To date, several scientific publications have discussed the application of membranes of nanofibres obtained from different polymers for capturing metal ions in solution. However, the performance of these membranes is not satisfactory and does not allow large-scale productivity.

Ignatova et al. (*Macromol. Rapid Commun.* 2008, 29, 1871-1876) describe the use of nanofibres of polystyrene associated with calixarenes for capturing nickel. No capture capacity is mentioned in this article. The polystyrene is recognized as being very hydrophobic and not very swellable in water.

Numerous publications are also to be found concerning fibres of polyacrylonitrile or derivatives thereof. (F. Huang, Materials 2013, 6, 969-980). Polyacrylonitrile is also recognized as being not very hydrophilic and therefore not very swellable in water.

Wang et al. (*J. Membr. Sci.* 2011, 379 191-199) have analysed a membrane obtained by electrospinning from a solution of polyvinyl alcohol (PVA) and polyethylenimine (PEI). Its capacity for capturing copper is 67.16 mg/g. However, the regeneration of this membrane requires either very strong acid or basic solutions or a powerful and toxic organic complexing agent, such as EDTA. Moreover, these polymers are not sufficiently hydrophilic for the treatment of substantially aqueous industrial effluents.

Xiao et al. (*J. Appl. Polym. Sci.*, 2010, 116, 2409) have described a membrane obtained by electrospinning from a solution of polyacrylic acid (PAA) and polyvinyl alcohol (PVA). Its copper capture performance is approximately 10 mg/g and is therefore still very low. The incorporation of PVA into the initial polymers reduces the hydrophilic properties of the nanofibres, limiting the solubilization of the PAA.

Li and Hsieh (*Polymer* 2005, 46, 5133) have described the possibility of cross-linking a pure PAA nanofibre with beta-cyclodextrins. The authors chose to react the alcohol functions of the cyclodextrins with the anhydride functions of the PAA which are formed by annealing at 140° C. However, the permeability of this material is not sufficient, as the cyclodextrin content of approximately 30% remains high. Moreover, the tests for this material were carried out in an acid aqueous medium of pH 2-7 and over a maximum period of 24 h. This range of pH has no technical benefit in the field of retreatment of metals with PAA, as the latter acquires its complexing form in basic media.

As an alternative to electrospinning, techniques based on centrifugal force (centrifugal spinning) have recently been developed, such as for example, the FORCESPINNING® technique (Sarkar et al., *Materials Today*, 2010, 13(11), p 12-14). However, to date nanofibres obtained by this technology have not been used in the separation of ions in solution.

The nanofibres described in these previous publications cannot be used on an industrial scale for extracting and separating the metals because, on the one hand, they are not sufficiently hydrophilic in a substantially aqueous effluent and do not have a satisfactory capacity or specificity for capturing the metals and, on the other hand, they additionally require a very long capture or regeneration time.

In response to this problem, there is very strong interest in developing nanofibres which have a very high water-permeability and which do not dissolve. In order to improve the properties of these nanofibres vis-à-vis metal targets that are difficulted to extract or interfered with by elements of little interest, these nanofibres will be able to contain complexing molecules having very specific capture properties.

SUMMARY

A subject of the invention is to provide a material having a better performance in capturing metals, in particular metal salts originating from heavy metals, rare earths, alkali metals, alkaline earth metals, or actinides, in their stable or unstable isotopic forms, and remaining easy to regenerate in order to recover the metals captured.

The invention therefore relates to nanofibres obtained by electrospinning or centrifugal spinning, which are insoluble in water but very swellable in an essentially aqueous effluent, and are capable of being obtained by the process comprising the following steps:

(a) obtaining nanofibres by electrospinning or centrifugal spinning from a synthesis solution, said synthesis solution comprising:

(i) at least one hydrophilic and water-soluble initial polymer selected from the group comprising:
polyacrylic acid or polyacrylic acid copolymers,
anionic derivatives of polystyrene, such as polystyrene sulphonate or polystyrene sulphonate copolymers,
cationic derivatives of polystyrene, such as polystyrene trialkylbenzyl ammonium,
poly(4-vinylpyridine) or derivatives thereof,
polyvinyl alcohol or hydrophilic derivatives thereof,
polyvinylpyrrolidone, derivatives thereof, or copolymers thereof, or
a mixture thereof,
said hydrophilic and water-soluble initial polymer having a molecular weight from $1 \times 10^4$ to $1.5 \times 10^6$, in particular from $1 \times 10^4$ to $5 \times 10^5$, the hydrophilic and water-soluble initial polymer content in the synthesis solution being from 5 to 50 wt. %, preferably from 10 to 30 wt. %, relative to the synthesis solution, (ii) optionally at least one additive selected from:
a cross-linking agent from 0.05 to 40 wt. %, in particular from 1 to 40 wt. %, particularly from 5 to 20 wt. %, in particular 15 wt. %, relative to the hydrophilic and water-soluble initial polymer,
a complexing molecule from 1 to 40 wt. %, in particular from 1 to 30 wt. % relative to the hydrophilic and water-soluble initial polymer, said complexing molecule being selected from: a calixarene, a crown ether, or
a mixture thereof;

(b) stabilizing the nanofibres obtained in step (a) in order to obtain nanofibres that are insoluble but swellable in a substantially aqueous effluent,
said nanofibres having a cross-linking rate comprised between 5 and 40%, particularly from 5 to 20%, in particular of 15%.

The insoluble nanofibres of the present invention have several advantages compared with the materials currently used in the treatment of substantially aqueous effluents, in particular compared with the ion-exchange resins.

One of the main advantages is their performance compared with the conventional methods, in particular ion-exchange resins, for capturing metals, in particular metal salts originating from heavy metals, rare earths, alkali metals, alkaline earth metals, or actinides, in the stable or unstable isotopic forms thereof. This performance is linked to a rapid exchange of the salts between the effluent to be treated and said nanofibres, due to their very high specific surface area and their very significant swelling property such that it is actually the entire volume of the nanofibre that participates in the interaction with the effluent. This thus results in very short distances to be covered in the solid phase by the metal to be captured. These benefits can also be observed in the fibre regeneration steps. In fact, the elution volume for recovering the metals captured by the insoluble nanofibres of the invention is reduced with respect to that necessary for the resins of the same capacity.

By way of comparison, the specific surface area of a membrane constituted by nanofibres of the invention can be 100 times higher than that of the resins obtained from the same quantity of initial polymer.

Furthermore, when these nanofibres contain complexing molecules conferring upon them properties of selectivity vis-à-vis target ions, the latter, due to the swelling properties of the nanofibres, can easily access the very core of the fibres in order to be captured there. This is not possible with the resins that have to be post-functionalized in order to have a certain selectivity, post-functionalization being carried out essentially at their periphery and which, due to steric hindrance, reduces access to the core of the resins, thus reducing their effective capacity.

Finally, the possibility of easily and stably incorporating hydrophobic complexing molecules, such as calixarenes for example, by simple retention in the core of the nanofibres, makes it possible to very simply obtain a wide variety of nanofibres with dedicated sensitivity.

Within the context of the invention, by "nanofibres" is meant micrometric or submicronic fibres the diameter of which is from 50 nm to 10 µm, in particular from 100 nm to 5 µm, more particularly from 100 nm to 1 µm.

By "essentially aqueous effluent" is meant an aqueous effluent optionally containing traces of organic solvents of up to 5%. The organic solvents can in particular be present in an effluent, when said effluent originates from a conventional liquid-liquid process for the extraction of the rare earths or the heavy metals.

The term "insoluble" in the context of the invention means that the morphology of the nanofibres does not undergo any modifications that can be detected using an electron microscope after immersion for at least 24 hours in an essentially aqueous effluent as defined previously.

The term "swellable" refers to the capacity of a material, in this case the insoluble nanofibres of the invention, to allow water to penetrate inside, and throughout the entire volume of the nanofibres. In the context of the invention, all, or at least more than 95% of the chemical groups of the active sites (such as —COOH or —COO⁻ depending on the pH of the solution in the case of PAA nanofibres, for example) of the nanofibres of the invention are in contact with the aqueous effluent.

The swelling property of the insoluble nanofibres of the invention allows the active sites, even if they are present deep within a nanofiber, to be able to be directly in contact with the effluent to be treated and consequently to remain operational in order to capture the metals. An active site is a chemical group or a chemical structure constituted by several chemical groups capable of forming a complex or a salt with a metal or an element. In the context of the present invention, an active site can be understood as a complexing domain; it can be borne or formed by polymer chains or by a complexing molecule.

According to the invention, contact of the insoluble nanofibres of the invention with an essentially aqueous effluent produces rapid and complete swelling comprised between 30 seconds and 3 minutes.

By "complete swelling" is meant all or at least more than 95% of the chemical groups of the active sites of the nanofibres of the invention are in contact with the aqueous effluent.

Given that the initial polymers used in order to produce the insoluble nanofibres of the invention are hydrophilic and water-soluble polymers, the insolubility, i.e. resistance to solubilization of the nanofibres of the invention is conferred by the cross-linking and the swelling capacity of these nanofibres is substantially influenced by the cross-linking rate of said nanofibres.

The cross-linking rate corresponds to the proportion of covalent chemical bonds between adjacent polymer chains. It is calculated as a percentage of monomer units of the polymer chains involved in interchain bonds. It can be measured by differential scanning calorimetry.

The cross-linking rate is linked to the molecular weight of hydrophilic and water-soluble initial polymer.

This rate both positively influences the insolubility of the nanofibres produced by said polymer and negatively influences their swelling capacity. In other words, a greater resistance to the solubilization of the nanofibres but a lower swelling capacity of said nanofibres corresponds to a high cross-linking rate. The cross-linking rate therefore has to be optimized, taking account of these two competing parameters.

The preferential use of a polymer of high molecular weight leads to a reduction in the cross-linking rate necessary for the nanofibres to satisfy the insolubility and swelling criteria. The Inventors have thus found that a cross-linking rate limited between 5 and 40%, particularly from 5 to 20%, in particular to 15%, for the insoluble nanofibres and a molecular weight from $1 \times 10^4$ to $1.5 \times 10^6$ for the initial polymer are the optimum values for these two parameters respectively. This combination makes it possible to retain the swelling property of initial polymer, while ensuring the insolubility of the nanofibres of the invention.

The Inventors note that, for a given level of cross-linking agent, the cross-linking of the polymers having a high molecular weight is more effective than that of the polymers with low molecular weights. In fact, when the molecular weight of an initial polymer is too low, it is necessary to increase the percentage of cross-linking agent in order to obtain the same cross-linking rate. Too high a percentage of cross-linking agent in an initial synthesis solution leads to a loss of the swelling properties sought for the nanofibres of the invention.

On the other hand, when the molecular weight of polymer is too high, this polymer has too low a solubility in water. A synthesis solution having too low a concentration of soluble polymer does not make it possible to produce nanofibres from this synthesis solution.

Initial Polymer

The initial hydrophilic and water-soluble polymers give the insoluble nanofibres of the invention their water-permeability properties. The polymers capable of being used as hydrophilic and water-soluble initial polymer in the context of the invention are selected for their capacity to capture metal salts according to a principle of the ion exchange resin type. For example, polyacrylic acid or poly(4-vinylpyridine) can be selected when the nanofibres of the invention are utilized in applications requiring low selectivity. The additives, in particular the complexing molecules, can be added in order to give the nanofibres of the invention more specific properties.

The initial polymers for the implementation of the invention are hydrophilic polymers. This affinity for water allows the effluent to effectively penetrate the material and thus to rapidly bring the metals or the elements to be captured into contact with the active sites.

According to the invention, these polymers are in particular chosen from:
polyacrylic acid or polyacrylic acid copolymers,
anionic derivatives of polystyrene, such as polystyrene sulphonate or polystyrene sulphonate copolymers, cationic derivatives of polystyrene, such as polystyrene trialkylbenzyl ammonium,
poly(4-vinylpyridine) or derivatives thereof,
polyvinyl alcohol or hydrophilic derivatives thereof,
polyvinylpyrrolidone, derivatives thereof, or copolymers thereof, and
mixtures thereof.

By "polyacrylic acid" is meant a homopolymer of acrylic acid having the following repeat unit:

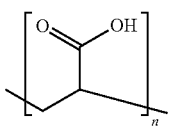

When the initial polymer is polyacrylic acid, it can comprise the carboxyl groups in the reduced (—COOH) or ionized (—COO⁻) form.

Preferably, the $pK_A$ of the polyacrylic acid as initial polymer in an aqueous solution is 4.25.

In an advantageous embodiment of the invention, the molecular weight of the polyacrylic acid as initial polymer is from $1.3 \times 10^5$ to $2.5 \times 10^5$.

By a copolymer of polyacrylic acid is meant a polymer originating from the copolymerization of acrylic acid and another monomer, such as maleic acid or styrene.

By way of example, the copolymers of polyacrylic acid may be mentioned as the copolymer of acrylic acid-maleic acid sodium of the following formula.

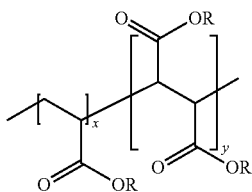

R = H or Na or a copolymer of styrene/acrylic acid of the following formula

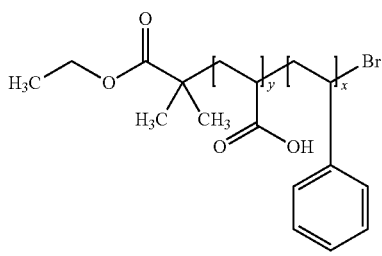

Polyacrylic acid and its co-polymers can be used in order to capture heavy metals, in particular copper, via ionized carboxyl groups.

According to the invention, an anionic derivative of polystyrene is a polymer with the polystyrene substituted by an anionic group such as a sulphonate, phosphate, phosphonate, phosphoryl, carboxyl group, such as the carboxymethyl group.

As examples of anionic derivatives of polystyrene, in particular polystyrene sulphonate, polystyrene phosphonate, carboxy polystyrene, polystyrene A-COOH may be mentioned.

As an example of the polystyrene sulphonate copolymers, a copolymer of styrenesulphonic acid and maleic acid of the following formula may be mentioned:

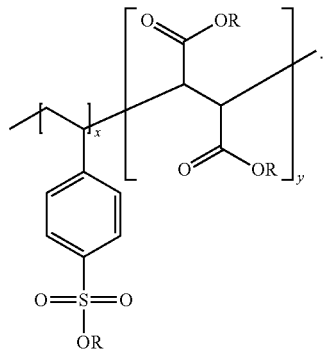

R = H or Na

According to the invention, a cationic derivative of polystyrene is a polymer with the polystyrene substituted by a cationic group such as a quaternary ammonium group, in particular a trialkyl benzyl ammonium group, or a tertiary amine group.

As an example of a cationic derivative of polystyrene, a polystyrene substituted by a trialkyl benzyl ammonium group, in particular a trimethyl benzyl ammonium group may be mentioned.

Cationic derivatives of polystyrene have a selectivity for the anionic salts of the elements to be captured, such as the $UO^{2-}$ anion.

By "poly(4-vinylpyridine)" is meant a 4-vinyl pyridine homopolymer having the following repeat unit:

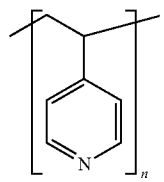

A poly(4-vinylpyridine) derivative is a poly(4-vinylpyridine) substituted at the meta or ortho position of the pyridine, the poly-3-vinylpyridine or the poly-2-vinylpyridine, respectively.

The pyridine groups, optionally substituted, can complex the cations of the heavy metals, in particular the dications, such as $Hg^{2+}$, $Cu^{2+}$.

By "polyvinyl alcohol" is meant a family of polymers obtained by alcoholysis of a vinyl ester and containing a proportion at least greater than 50% of the structural unit: —$(CH_2CHOH)_n$—.

In the context of the invention, by "derivative of polyvinyl alcohol" is meant the vinyl-vinyl alcohol copolymers.

By "polyvinylpyrrolidone" is meant a homopolymer of N-vinylpyrrolidone.

By a copolymer of polyvinylpyrrolidone is meant a polymer originating from the copolymerization of N-vinylpyrrolidone and another monomer.

As an example of the copolymers of polyvinylpyrrolidone, poly[(2-ethyldimethylammonioethyl methacrylate ethyl sulphate)-co-(1-vinylpyrrolidone)] (PNR4) may be mentioned.

Additives

A synthesis solution for electrospinning or centrifugal spinning can also comprise, in addition to hydrophilic and water-soluble initial polymer, at least one additive.

According to the invention, an additive, when it is present in a synthesis solution, can be either incorporated in the nanofibres of the invention by cross-linking with the polymers, as is the case for a cross-linking agent, or simply immobilized in the matrix of the nanofibres when said additive is hydrophobic, such as a non-crosslinking complexing molecule.

The additives can be of two kinds: cross-linking agents, such as chemical or photochemical cross-linking agents and complexing molecules, such as cage molecules. The complexing molecules can either act solely as complexing agents, or as complexing and cross-linking agents when they comprise, in addition to their complexing functions, chemical or photochemical functions allowing cross-linking with the initial hydrophilic polymers.

The complexing molecules provide the nanofibres of the invention with specificity vis-à-vis the metals to be captured. They are designed to very selectively capture a salt or only certain metal salts.

Depending on the need for specific properties and on the hydrophilic nature or hydrophobic of the complexing molecules, there are four possibilities for the constitution of the nanofibres of the present invention:

The cross-linking can be carried out in the absence of a cross-linking agent, such as by VUV or UV treatment;

The cross-linking can be carried out by chemical cross-linking agents which comprise functions allowing cross-linking with the initial hydrophilic polymers or by photochemical cross-linking agents which comprise functions that can be photoactivated by VUV, UV or visible radiation;

In the presence of complexing molecules comprising, in addition to their complexing functions, chemical or photochemical functions allowing cross-linking, the cross-linking can be carried out by the complexing molecules themselves. The cross-linking of the hydrophilic and water-soluble initial polymer by these complexing molecules makes it possible to fix the latter in the structure of the nanofibres and to prevent their extraction during the use of the insoluble nanofibres of the invention.

In the presence of hydrophobic complexing molecules, it is not necessary to fix them by cross-linking in the hydrophilic and water-soluble initial polymer. The hydrophobic complexing molecules can be simply immobilized by means of hydrophobic retention via a solvent impregnation process. This hydrophobic retention phenomenon is strong enough to prevent the extraction of these hydrophobic complexing molecules by an essentially aqueous effluent during the use of the nanofibres. On the other hand, the cross-linking of the hydrophilic and water-soluble initial polymer by another means is still necessary in order to stabilize the nanofibres.

By "cross-linking agent" is meant a compound which links chains of polymers by means of chemical bonds, in particular covalent bonds, in order to constitute a network of higher molecular weight and having different physico-chemical properties from the initial polymer, for example insolubility in an essentially aqueous effluent.

According to the invention, in order for the nanofibres based on hydrophilic and water-soluble polymers to be insoluble in a substantially aqueous effluent, these nanofibres have to be stabilized by cross-linking with a controlled cross-linking rate. In order for the cross-linking to be able to take place with a cross-linking rate comprised between 5 and 40%, particularly from 5 to 20%, in particular 15%, the quantity of said cross-linking agent has to be from 0.05 to 40 wt. %, in particular from 1 to 40 wt. %, particularly from 5 to 20 wt. %, more particularly 15 wt. % relative to the weight of the hydrophilic and water-soluble initial polymer in the synthesis solution.

Generally, the quantity of cross-linking agent introduced into the synthesis solution is determined as a function of the molar mass of the initial polymer. Thus, if the molar mass of the initial polymer is high, a low percentage of cross-linking agent will be selected; if the molar mass of the initial polymer is low, a higher percentage will rather be selected for the cross-linking agent.

According to the invention, said cross-linking agent is selected from the group comprising:
a diazide, in particular diazidostilbene,
a diamine, in particular hexamethylenediamine,
a hydrophilic polymer selected from the group comprising a polyethylene glycol, a polyhydroxyethyl methacrylate, polyvinylpyrrolidone, derivatives thereof or copolymers thereof,
a ($C_1$-$C_{10}$) dibromoalkane, in particular 1,4-dibromobutane
a dibromo-p-xylene
a ($C_1$-$C_{10}$) diiodoalkane in particular 1,4-diiodobutane,
a ($C_1$-$C_{10}$) dichloroalkane in particular 1,4-dichlorobutane, and
a calixarene of Formula I:

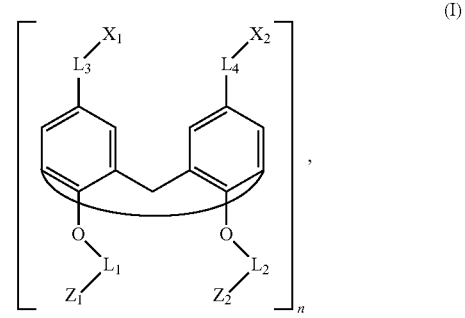

in which:
$X_1$ and $X_2$ each represent, independently of each other, H or a

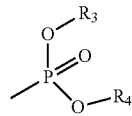

group, in which $R_3$ and $R_4$ each represent, independently of each other, H or a ($C_1$-$C_8$) alkyl group, provided that $X_1$ and $X_2$ do not simultaneously represent H,
$L_1$, $L_2$, $L_3$ and $L_4$ are spacer groups, selected independently of each other, from the group consisting of a ($C_3$-$C_{10}$) cycloalkylenyl, O, NH, —$(CH_2)_q$—, q being an integer from 1 to 12, $Z_1$ and $Z_2$ each represent, independently of each other, a functional group selected from an optionally protected amine, F, Cl, Br, I, OH, C(=O)H, C(=O)Hal, an aryl group or a substituted aryl group, such as a tosyl, a diazonium group, an aromatic heterocycle such as a pyrrolyl, furyl, thienyl, or pyridinyl group, an optionally protected sulphate or sulphonate group, n is an integer from 1 to 10; or a calixarene of Formula II

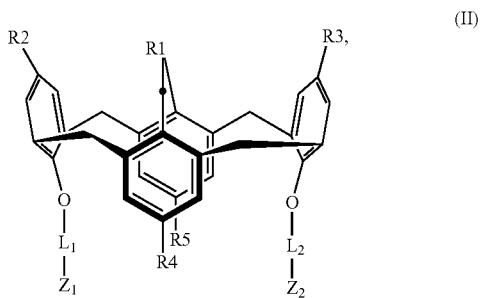

in which:

R1 is selected from —X(C$_2$H$_4$X)$_m$—, or —X(C$_2$H$_4$X)$_{p/2}$YX(C$_2$H$_4$)$_{p/2}$—, X being selected independently from O and/or N, m being equal to 3, 4, 5 or 6, p being equal to 2 or 4, Y being a (C$_3$-C$_{10}$) cycloalkylene or a (C$_6$-C$_{10}$) arylene; and $R_2$ to $R_5$ are selected independently of each other from H, or a (C$_1$-C$_6$) alkyl;

$L_1$ and $L_2$ are spacer groups, selected independently of each other from a (C$_3$-C$_{10}$) cycloalkylene or a (C$_3$-C$_{10}$) arylene, —(CH$_2$)$_q$—, q being an integer from 1 to 12;

$Z_1$, $Z_2$ are grafting groups, selected independently of each other from F, Cl, Br, I, —OHNH$_2$, —C(=O)OH, —C(=O)Hal, an aryl group or a substituted aryl group, such as a tosyl, a diazonium group, an aromatic heterocycle such as a pyrrolyl, furyl, thienyl, or pyridinyl group, an optionally protected sulphate or sulphonate group.

In the calixarenes of Formula I or II, $L_1$-$Z_1$ and $L_2$-$Z_2$ together constitute cross-linking arms.

In a particular embodiment of the invention, when the initial polymer is polyacrylic acid or copolymers thereof, said cross-linking agent is preferably a diazide, a diamine, a polyethylene glycol or a polyhydroxyethyl methacrylate.

During stabilization of the nanofibres, the diamine forms interchain amide bonds (—CO—NH—) with polyacrylic acid or anionic derivatives thereof. A polyethylene glycol or a polyhydroxyethyl methacrylate as cross-linking agent forms, with the initial hydrophilic polymers, ester-type interchain bonds.

According to the invention, the diamine can be in particular selected from ethylenediamine, 1,3-diaminopropane, 1,4-diaminobutane, 1,5-diaminopentane, and hexamethylenediamine.

In another particular embodiment of the invention, when the initial polymer is poly(4-vinylpyridine) or derivatives thereof, said cross-linking agent is preferably a diazide, in particular diazidostilbene (DAS), a (C$_1$-C$_{10}$) dibromoalkane or a (C$_1$-C$_{10}$) diiodoalkane, in particular 1,4-dibromobutane or 1,4-diiodobutane.

In a synthesis solution according to the present invention, polyvinylpyrrolidone, derivatives thereof and copolymers thereof can be used both as a hydrophilic and water-soluble initial polymer and as a cross-linking agent.

During stabilization of the nanofibres in the presence of a diazide-type cross-linking agent, the photoactivation of the diazide group leads to the formation of a nitrene group, a reaction intermediate involved in numerous chemical reactions such as reactions of insertion, in particular into a C—H, O—H, or N—H bond. The diazides are therefore particularly well suited for cross-linking any type of polymer used in the invention.

According to the invention, the diazide can be a diazide that is commercially available such as diazidostylbene (DAS), or easily manufactured according to a method known to a person skilled in the art, such as reacting an azidoaniline precursor with long terminal (C$_4$-C$_{10}$) dianhydride compounds, or with a dianhydride polymer such as polyethyl methacrylate anhydride (PEMA).

When the cross-linking agent is a diamine, the quantity thereof is preferably from 5 to 20 wt. %, in particular 15 wt. %, relative to the weight of hydrophilic and water-soluble initial polymer in the synthesis solution.

When the cross-linking agent is a diazide, the quantity thereof is preferably from 1 to 40 wt. %, in particular from 1 to 20 wt. %, relative to the weight of hydrophilic and water-soluble initial polymer in the synthesis solution.

When the cross-linking agent comprises a photoactivatable group, such as a diazide, the photoactivation is carried out by UV/visible irradiation, typically at 365 nm.

In an embodiment of the invention, the abovementioned synthesis solution containing a hydrophilic and water-soluble initial polymer also comprises a calixarene of Formula I or of Formula II as defined previously as cross-linking agent.

In a calixarene of Formula I or II, the $Z_1$ and $Z_2$ radicals make it possible to implement the cross-linking with the hydrophilic and water-soluble initial polymer chains.

According to the invention, these calixarenes are in particular those described in the application FR 14/52958 and those described in the international application WO 2013/124831.

Preferably, said calixarene is selected from compounds A and/or B below:

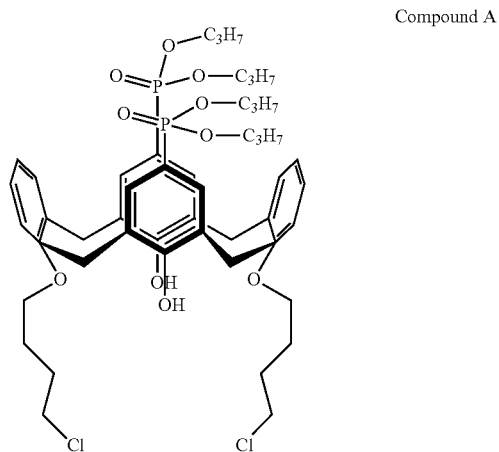

Compound A

Compound B

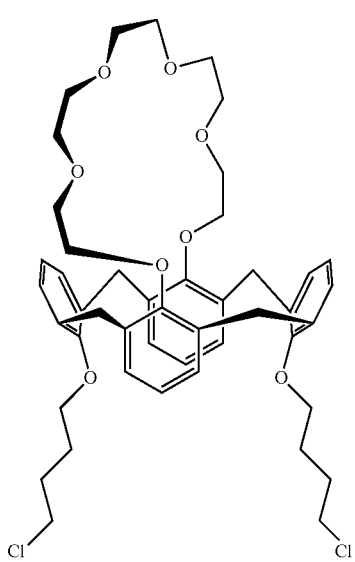

In addition to their structural role when they are used as cross-linking agent, the calixarenes give the nanofibres of the invention a selectivity vis-à-vis certain rare earths, or certain radionuclides such as caesium.

In a particular embodiment and because of their hydrophobicity, the non-crosslinking calixarenes can also be stably incorporated into the insoluble nanofibres of the invention without it being necessary to cross-link them with this matrix. If the calixarene is sufficiently hydrophobic, it is incorporated and immobilized in the nanofibres, by hydrophobic retention via a solvent impregnation process, and the calixarene thus retained cannot be extracted by the aqueous medium in which it is insoluble. The calixarene is typically immobilized in the nanofibres by means of Pi-Pi interactions and/or Van der Waals bonds. As the stabilized nanofibres remain water-permeable, they then make it possible to bring the aqueous phase into contact with the calixarene of interest.

The incorporation of the calixarenes into the insoluble nanofibres of the invention can be carried out at the time of the synthesis of the nanofibres by adding the calixarene of interest to the synthesis solution. In this way the calixarenes are homogeneously distributed in the nanofibres produced by electrospinning or by centrifugal spinning.

The incorporation can also be carried out after the synthesis and the stabilization of the nanofibres, using a solvent that is both capable of dissolving the calixarenes and able to easily swell the nanofibres without dissolving them. Such a solvent can be selected from the alcohols, tetrahydrofuran (THF) or dimethylformamide (DMF) in order to incorporate the calixarenes in the polyacrylic acid or the poly(4-vinylpyridine). This way of incorporating calixarenes can be implemented by the following method:

impregnating the nanofibres originating from the stabilization by immersion in a solution containing a suitable solvent as described above and the hydrophobic calixarenes, recovering the nanofibres thus impregnated and removing the solvent by drying to dryness.

In this specific case, it is not necessary for these calixarenes to comprise functional groups, such as the $Z_1$, $Z_2$ groups in the case of the calixarenes of Formula I or II, which allow them to cross-link with a polymer.

These calixarenes are well known to a person skilled in the art.

As examples of hydrophobic non-crosslinking calixarenes which can be incorporated in the nanofibres of the invention, the following may be mentioned:

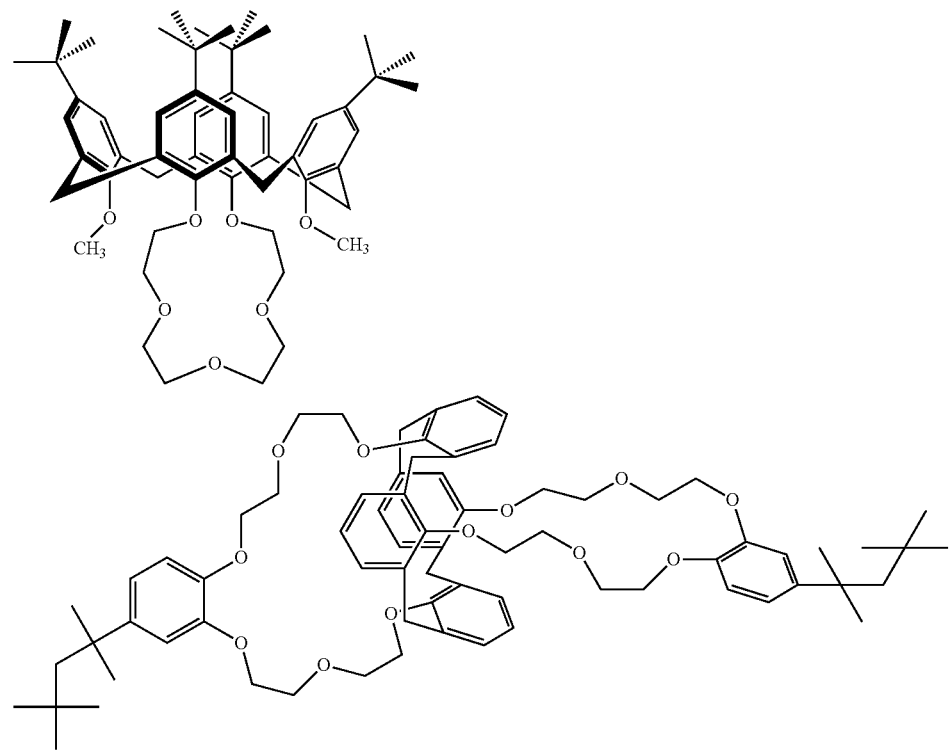

Synthesis Solution

By "synthesis solution" is meant an aqueous or organic liquid solution comprising a solvent or a mixture of solvents.

Said solution can be an aqueous solution comprising another water-miscible organic solvent, such as ethanol, propanol, tetrahydrofuran (THF), or a mixture thereof. The presence of an organic solvent can be useful for preparing nanofibres with a mixed matrix in which certain molecules are soluble in an organic solvent and not in water.

For example, preference will be given to an aqueous solution for solubilizing an amine-containing cross-linking agent such as a diamine, rather than an organic synthesis solution as the latter promotes the formation of linked ionic pairs between the amines and the acids, which limits the solubility of the polymer and leads to precipitation thereof. If however, work is carried out in an organic medium in the presence of an amine cross-linking agent, the medium is acidified (pH<4) in order to prevent the precipitation of the polymer.

An organic synthesis solution, in particular an alcohol solution, can be used in order to solubilize the calixarenes which have only a low water-solubility. By "alcohol solution" is meant pure ethanol used as solvent.

In an embodiment, in order to prepare the nanofibres of the invention in which the calixarenes are directly cross-linked with the polyacrylic acid, the synthesis solution is a mixture of an alcohol solution in which the polyacrylic acid is dissolved and THF in which calixarenes are dissolved. The ethanol and the THF are miscible.

In another embodiment, in order to prepare the nanofibres of the invention containing the calixarenes in which the polyacrylic acid is cross-linked using the cross-linking agent HMDA, the synthesis solution is an alcohol solution acidified, in particular to pH 2, in order to prevent the precipitation of the calixarenes.

In an advantageous embodiment, the abovementioned aqueous solution is a water/ethanol solution.

In an advantageous embodiment, the solvents in said synthesis solution are ethanol and THF.

Electrospinning

The term "electrospinning" refers to a process consisting of injecting a polymer solution through a needle, under high electrical voltage, in order to produce nanofibres. This technology makes it possible to produce long polymer fibres with a diameter in the range from one nanometre to a few microns and to obtain a nanostructured material with a specific surface area and a very high porosity compared with resins.

Electrospinning technology has been described in the prior art (Li and Xia, *Advanced Materials* 2004, 16 (14): 1151) and is well known to a person skilled in the art.

The electrospinning of a polymer solution according to the abovementioned step (a) can be implemented using an industrial device currently available for this process, for example the "SPIN Line 120" equipment from SPUR or the "NANOSPINNER 416" equipment from INOVENSO.

The electrical voltage applied is that which makes it possible to overcome the surface tension of the synthesis solution of polymer and can vary between 0 and 100 kV depending on the power supplies used.

The nanofibres produced by electrospinning can be deposited on a conducting collector in order to form a membrane. The distance between the needle and the nanofibre collector is a distance which allows the complete evaporation of the water and any other solvent in said polymer synthesis solution and the solidification of the polymer. This distance can be determined according to the quantity and the nature of the solvent and the concentration of polymer in said synthesis solution.

Electrospinning for the production of the nanofibres of the invention can be any type of electrospinning known in the art, in particular electrospinning of the "free surface" type, during the implementation of which the synthesis solution is polarized on the surface of a roller which rotates in a synthesis solution containing a hydrophilic and water-soluble initial polymer. The high voltage is applied between the top part of the roller wetted by the synthesis solution and the counter electrode placed above.

The nanofibres are formed from the surface of the roller, in a random manner but in larger quantities. This type of electrospinning allows industrial production.

Centrifugal Spinning

The term "centrifugal spinning», or "FORCESPIN-NING®" or "high-speed rotary spinning", refers to a process using centrifugal forces which allow a synthesis solution to pass through the orifices of the spinneret in order to produce nanofibres. In fact, outside the spinneret, the jet of the synthesis solution is subjected to a shear force which helps to evaporate the water or any other solvent contained in the synthesis solution and forms a membrane by being deposited on a collector. Centrifugal spinning makes it possible to produce nanofibres without the use of an electric field and can consequently be applied to non-conductive synthesis solutions.

These techniques, widely used in the field of glass fibres have very recently been adapted to polymer fibres (Sarkar et al., *Materials Today*, 2010, 13(11), p 12-14) and represent a useful alternative to electrospinning for producing nanofibres in large quantities and at low cost (Zhang and Lu, *Polymer Reviews*, 2014, 54:677-701).

Devices for implementing centrifugal spinning are available on the market, for example the FORCESPINNING® devices marketed by FibeRio.

The main parameters influencing the formation and the morphology of the nanofibres are the concentration of the synthesis solution, its viscosity, the speed of rotation of the spinneret, the distance between the collector and the spinneret, as well as the calibre of the spinneret orifices.

The speed of rotation of the spinneret is a sufficient speed which allows the synthesis solution to pass through the orifices on the wall of the spinneret, and in particular from 3,000 to 5,000 rpm.

The distance between the spinneret and the nanofibre collector is a distance which allows complete evaporation of the water and any other solvents present in said synthesis solution and the solidification of the polymer. This distance can be determined depending on the quantity and the nature of the solvent and the polymer concentration in said synthesis solution.

Stabilization of the Nanofibres

The cross-linking process makes it possible to stabilize the nanofibres originating from the electrospinning or centrifugal spinning process and render them insoluble in an essentially aqueous effluent.

According to the invention, the stabilization of the nanofibres obtained by electrospinning or centrifugal spinning is implemented by a heat treatment or by radiation with ultra-violet rays of the VUV (Vacuum Ultra-Violet) or UV type or by visible radiation.

Radiation Treatment

The objective of the radiation treatment is to create, within the nanofibers, excited states which generate free radicals that can bring about a chemical reaction with each other or with cross-linking agents in order that the cross-linking can take place.

By way of comparison, in the absence of stabilization, the nanofibres manufactured from hydrophilic polymers are completely soluble in water or ethanol.

According to the type of radiation selected, the cross-linking of the nanofibres can be brought about either using a cross-linking agent, or without cross-linking agent.

As a general rule, VUV or UV radiation is more energy-efficient than visible radiation or heat treatment and can be implemented alone without needing a cross-linking agent.

According to the invention, VUV radiation is radiation with a wavelength comprised between 100 and 200 nm, in particular between 160 and 180 nm, more particularly 172 nm, and can for example be generated by a xenon excimer lamp.

By way of example, the 172 nm radiation from the OSRAM-brand excimer lamp of the XERADEX® type makes it possible to break the bonds of the polyacrylic acid or of an anionic derivative of the polyacrylic acid, or the bonds of the poly(4-vinylpyridine) or derivatives thereof and thus create excited species, in particular radicals and/or ions, allowing them to react chemically with each other.

The duration of radiation can be from 0.5 to 15 min. Typically this duration is 2 minutes at a distance of 15 cm in the case of PAA and 2 minutes at a distance of 4 cm in the case of P4VP.

According to the invention, UV radiation is radiation with a wavelength comprised between 100 and 400 nm, in particular between 200 and 400 nm, more particularly 254 nm, and can for example be generated by a laboratory lamp of the Fischer Scientific type. The duration of radiation can be from 0.1 second to 60 min depending on the power of the irradiation used. The power of electromagnetic radiation is typically from 35 to 40 mW/cm$^2$.

According to the invention, visible radiation is radiation with a wavelength comprised between 200 and 1,000 nm, in particular between 400 and 800 nm, and can for example be generated by sunlight or by a suitable lamp. The duration of radiation can be from 5 to 60 min depending on the power of the lamp. Typically, this duration is 20 minutes at a distance of 5 cm in the case of a power of 6 Watts.

Heat Treatment

As a general rule, the temperature and the duration selected in the context of the present invention for a heat treatment must make it possible to retain the integrity of the nanofibres and prevent the fusion of the nanofibres during this treatment.

According to the invention, the heat treatment is carried out at a temperature from 20° C. to 220° C., in particular from 20° C. to 180° C., particularly at a temperature from 60° C. to 160° C., more particularly at a temperature from 120° C. to 150° C.

The duration of the heat treatment depends on the temperature applied during this treatment. Typically, when this treatment is carried out at 145° C., the duration of treatment is from approximately 30 to 60 minutes. It can reach as much as several hours (typically from 5 to 10 hours) if the temperatures applied are of the order of 80° C. to 120° C.

When the stabilization is implemented by a heat treatment, the polymer solution preferably contains a cross-linking agent.

By way of example, a heat treatment between 120° C. and 160° C. leads to the formation of anhydrides by dehydration within the polyacrylic acid, allowing a chemical reaction with an amine cross-linking agent, such as HMDA for example. In the same way, when the synthesis solution comprises a calixarene bearing cross-linking arms having amine functions, a heat treatment at 140° C. promotes the stabilization of the nanofibres via the formation of anhydrides.

A heat treatment above 180° C. can lead to the fusion of the nanofibres.

The selection of the method for stabilization of the nanofibres obtained from a synthesis solution depends on said synthesis solution.

The nanofibres obtained from a synthesis solution without cross-linking agent are cross-linked by VUV or UV radiation.

When a synthesis solution comprises a cross-linking agent, the nanofibres obtained from said synthesis solution can be stabilized by a heat treatment or by VUV, UV or visible radiation.

When the synthesis solution comprises a calixarene which does not bear cross-linking arms and this solution does not comprise another cross-linking agent, then stabilization by VUV or UV radiation is necessary.

In a particular embodiment, the nanofibres of the invention are capable of being obtained by the process comprising the following steps:
(a) obtaining the nanofibres by electrospinning or centrifugal spinning from a synthesis solution, said solution comprising a cross-linking agent and a hydrophilic and water-soluble initial polymer as described above having a molecular weight from $1\times10^4$ to $1.5\times10^6$, in particular from $1\times10^4$ to $5\times10^5$,
(b) stabilizing the nanofibres obtained in step (a) by a heat treatment in order to obtain nanofibres that are insoluble, but swellable in an essentially aqueous effluent.

In an advantageous embodiment, the insoluble nanofibres of the invention are obtained by heat treatment of the nanofibres, produced by electrospinning or centrifugal spinning from an aqueous solution comprising polyacrylic acid as initial polymer and a diamine as cross-linking agent.

More advantageously, the nanofibres of the invention are capable of being obtained by the process comprising the following steps:
(a) obtaining the nanofibres by electrospinning or centrifugal spinning from a synthesis solution, said solution comprising 0.2-4 wt. % hexamethylenediamine, relative to the synthesis solution, as cross-linking agent and 20-25 wt. % polyacrylic acid having a molecular weight from $1.3\times10^5$ to $2.5\times10^5$, relative to the synthesis solution, as initial polymer,
(b) stabilizing the nanofibres obtained in step (a) by a heat treatment, said nanofibers being insoluble but swellable in an essentially aqueous effluent having a cross-linking rate comprised between 5 and 20%.

In a particularly advantageous embodiment, the invention relates to nanofibres that are insoluble in an essentially aqueous effluent, obtained by heat treatment of the nanofibres produced by electrospinning or centrifugal spinning from an alcoholic synthesis solution acidified to pH 2 and comprising:
polyacrylic acid having a molecular weight from $1\times10^4$ to $5\times10^5$, in particular from $1.3\times10^5$ to $2.5\times10^5$, as initial polymer, and
hexamethylenediamine as cross-linking agent.

In another particularly advantageous embodiment, the invention relates to nanofibres that are insoluble in an essentially aqueous effluent, obtained by heat treatment of the nanofibres produced by electrospinning or centrifugal spinning from a synthesis solution based on different miscible organic solvents such as ethanol/THF, acidified to pH 2 and comprising:
polyacrylic acid having a molecular weight from $1 \times 10^4$ to $5 \times 10^5$, in particular from $1.3 \times 10^5$ to $2.5 \times 10^5$, as initial polymer, and
hexamethylenediamine as cross-linking agent.
a calixarene.

Another advantageous embodiment of the invention relates to nanofibres that are insoluble in an essentially aqueous effluent, obtained by heat treatment of the nanofibres produced by electrospinning or centrifugal spinning from an aqueous or alcoholic synthesis solution comprising:
polyacrylic acid having a molecular weight from $1 \times 10^4$ to $5 \times 10^5$, in particular from $1.3 \times 10^5$ to $2.5 \times 10^5$, as initial polymer, and
a polyethylene glycol having a molecular weight from 950 to 1,050 or a polyhydroxyethyl methacrylate having a molecular weight from 20,000 as cross-linking agent.

Another advantageous embodiment of the invention relates to nanofibres that are insoluble in an essentially aqueous effluent, obtained by heat treatment of the nanofibres produced by electrospinning or centrifugal spinning from an alcoholic synthesis solution comprising:
poly(4-vinylpyridine) having a molecular weight from $1 \times 10^4$ to $5 \times 10^5$ as initial polymer, and
1,4-dibromobutane or 1,4-diiodobutane as cross-linking agent.

In another embodiment, the nanofibres that are insoluble in an essentially aqueous effluent of the invention are capable of being obtained by the process comprising the following steps:
(a) obtaining the nanofibres by electrospinning or centrifugal spinning from a synthesis solution of a hydrophilic and water-soluble initial polymer as described above,
(b) stabilizing the nanofibres obtained in step (a) by VUV or UV radiation or by visible radiation in order to obtain nanofibres that are insoluble but swellable in an essentially aqueous effluent.

A more particular embodiment relates to the insoluble nanofibres of the invention, capable of being obtained by the process comprising the following steps:
(a) obtaining the nanofibres by electrospinning or centrifugal spinning from an alcoholic synthesis solution of poly(4-vinylpyridine) as initial polymer, said poly(4-vinylpyridine) having a molecular weight from $1 \times 10^4$ to $5 \times 10^5$,
(b) stabilizing the nanofibres obtained in step (a) by VUV or UV radiation or by visible radiation.

Another more particular embodiment relates to the insoluble nanofibres of the invention, capable of being obtained by the process comprising the following steps:
(a) obtaining the nanofibres by electrospinning or centrifugal spinning from an aqueous or alcoholic synthesis solution of polyacrylic acid with a molecular weight from $1.3 \times 10^5$-$2.5 \times 10^5$ as initial polymer,
(b) stabilizing the nanofibres obtained in step (a) by VUV or UV radiation or by visible radiation.

Another more particular embodiment relates to the insoluble nanofibres of the invention, capable of being obtained by the process comprising the following steps:
(a) obtaining the nanofibres by electrospinning or centrifugal spinning from an alcoholic synthesis solution comprising:
polyvinylpyrrolidone with a molecular weight of $1.0 \times 0^6$ as initial polymer, and optionally a cage molecule of 5-30 wt. % relative to the hydrophilic and water-soluble initial polymer,
(b) stabilizing the nanofibres obtained in step (a) by heat treatment.

By way of example, the polyvinylpyrrolidone content in the synthesis solution can be 15 wt. % relative to the synthesis solution.

The heat treatment of these nanofibres can be carried out at 215° C. for 2 hours.

Another more particular embodiment relates to the insoluble nanofibres of the invention, capable of being obtained by the process comprising the following steps:
(a) obtaining the nanofibres by electrospinning or centrifugal spinning from an alcoholic synthesis solution comprising:
15 wt. % polyvinylpyrrolidone with a molecular weight of $1.0 \times 0^6$, relative to the synthesis solution
5 wt. % polystyrene sulphonate with a molecular weight of 75,000, relative to the synthesis solution,
(b) stabilizing the nanofibres obtained in step (a) by heat treatment.

The heat treatment of these nanofibres can be carried out at 215° C. for 2 hours.

Another more particular embodiment relates to the insoluble nanofibres of the invention, capable of being obtained by the process comprising the following steps:
(a) obtaining the nanofibres by electrospinning or centrifugal spinning from an alcoholic synthesis solution comprising:
15 wt. % poly-4-vinylpyridine (P4VP) with a molecular weight of 160,000, relative to the synthesis solution,
0.65 wt. % dibromo-p-xylene relative to the synthesis solution or 5-10 wt. % 1-4 dichlorobutane, relative to the synthesis solution, as cross-linking agent
(b) stabilizing the nanofibres obtained in step (a) by heat treatment.

The heat treatment of these nanofibres can be carried out at 150° C. for 1 hour.

Another more particular embodiment relates to the insoluble nanofibres of the invention, capable of being obtained by the process comprising the following steps:
(a) obtaining the nanofibres by electrospinning or centrifugal spinning from an aqueous synthesis solution comprising:
25 wt. % polyacrylic acid with a molecular weight of $2.5 \times 10^5$, relative to the synthesis solution,
2.5 wt. % poly(styrene sulphonate-co-maleic acid) with a molecular weight of $2.0 \times 10^5$, relative to the synthesis solution,
17 wt. % hexamethylenediamine, relative to the synthesis solution, as cross-linking agent
(b) stabilizing the nanofibres obtained in step (a) by heat treatment.

The heat treatment of these nanofibres can be carried out at 160° C. for 2 hours.

Another more particular embodiment relates to the insoluble nanofibres of the invention, capable of being obtained by the process comprising the following steps:
(a) obtaining the nanofibres by electrospinning or centrifugal spinning from an aqueous synthesis solution containing 10 wt. % poly[(2-ethyldimethylammonioethyl methacrylate ethyl sulphate)-co-(1-vinylpyrrolidone)] with a molecular weight of $10^6$,
(b) stabilizing the nanofibres obtained in step (a) by heat treatment.

The heat treatment of these nanofibres can be carried out at 200° C. for 2 hours.

According to the invention, the diameter of an insoluble nanofibre of the invention is from 50 nm to 10 μm, in particular from 100 nm to 5 μm, more particularly from 100 nm to 1 μm, even more particularly from 100 nm to 300 nm.

This diameter plays a role in the speed of diffusion of an effluent in said nanofibre and therefore in the effectiveness of the extraction.

The present invention also relates to a membrane constituted by nanofibres that are insoluble but swellable in an essentially aqueous solvent as described above.

Said membrane is in particular constituted by one and the same type of nanofibres of the invention that are insoluble but swellable.

In a particular embodiment, the invention relates to a membrane constituted by nanofibres based on polyacrylic acid produced by electrospinning or centrifugal spinning and stabilized by VUV or UV radiation or by visible radiation, as described above.

In another particular embodiment, the invention relates to a membrane constituted by nanofibres based on polyacrylic acid produced by electrospinning or centrifugal spinning and stabilized by heat treatment using hexamethylenediamine as cross-linking agent, as described above.

In another particular embodiment, the invention relates to a membrane constituted by nanofibres based on poly(4-vinylpyridine) by electrospinning or centrifugal spinning and stabilized by VUV or UV radiation or by visible radiation, as described above.

A main advantage of the nanofibres that are insoluble in an essentially aqueous effluent of the invention is their capacity to capture heavy metals, rare earths or radioactive elements, due to their very large specific surface area and optionally to the presence of complexing molecules.

When the nanofibres are manufactured in the form of a membrane, the specific surface area thereof can be greater than 15 m$^2$/g, larger than that of ion-exchange resins (FIG. 4).

These nanofibres are therefore more effective than the resins and capable of treating industrial effluents.

An aspect of the invention relates to the use of the nanofibres that are insoluble but swellable in an essentially aqueous effluent as described above, for treating an effluent containing metals, in particular metal salts originating from heavy metals, rare earths, alkali metals, alkaline-earth metals, or actinides, in the stable or unstable isotopic forms thereof.

The metals targeted by the present invention comprise in particular copper (Cu), caesium (Cs), mercury (Hg), chromium (Cr), lead (Pb), zinc (Zn), uranium (U) and plutonium (Pu).

The term "rare earths" refers to a group of chemical elements constituted by scandium (Sc), yttrium (Y), and the fifteen lanthanides, namely lanthanum (La), cerium (Ce), praseodymium (Pr), neodymium (Nd), promethium (Pm), samarium (Sm), europium (Eu), gadolinium (Gd), terbium (Tb), dysprosium (Dy), holmium (Ho), erbium (Er), thulium (Tm), ytterbium (Yb) and lutecium (Lu).

The term "actinide" refers to a group of chemical elements constituted by lawrencium (Lr), actinium (Ac), thorium (Th), protactinium (Pa), uranium (U), neptunium (Np), plutonium (Pu), americium (Am), curium (Cm), berkelium (Bk), californium (Cf), einsteinium (Es), fermium (Fm), mendelevium (Md), nobelium (No).

The term "radioactive element" refers to natural radioactive chemical elements or fission products. It can be all of the metals of the periodic table, whether they are for example monovalent like caesium, divalent like strontium or trivalent like the lanthanides.

A particular embodiment of the invention relates to the use of the insoluble nanofibres of the invention obtained from an aqueous solution of polyacrylic acid or of copolymers for treating an effluent containing copper, in particular in the cation form $Cu^{2+}$.

By way of example, the insoluble nanofibres of the invention obtained from an aqueous solution of polyacrylic acid can capture copper up to 280 mg/g. This capacity is 50% greater than that of the best resins known in the prior art based on polyacrylic acid.

Another particular embodiment of the invention relates to the use of the insoluble nanofibres of the invention obtained from a synthesis solution organic comprising:
polyacrylic acid or anionic derivatives thereof, and
a calixarene of Formula I or Formula II or a non-crosslinking calixarene as defined above, for treating an effluent containing caesium.

Advantageously, the solvents in said synthesis solution are ethanol and THF.

More particularly, the invention relates to the use of insoluble nanofibres obtained from a synthesis solution comprising polyacrylic acid and calixarene (compound B) for treating an effluent containing caesium.

Said calixarene can be either cross-linked with polyacrylic acid, or simply immobilized, due to its hydrophobicity, in the polymer matrix.

Another particular embodiment of the invention relates to the use of the insoluble nanofibres of the invention obtained from an aqueous synthesis solution comprising the cationic derivatives of polystyrene for treating an effluent containing uranium, in particular in the anion form $UO^{2-}$.

A subject of the invention is also the provision of a process for the extraction from an effluent, of metals, in particular metal salts originating from heavy metals, rare earths, alkali metals, alkaline earth metals, or actinides, in the stable or unstable isotopic forms thereof, said process comprising the following steps:

(i) placing the nanofibres of the invention that are insoluble but swellable, optionally in the form of membrane, in an essentially aqueous effluent, as described above for a sufficient time;

(ii) recovering the metals, in particular the metal salts originating from the heavy metals, rare earths, alkali metals, alkaline earth metals, or actinides, in the stable or unstable isotopic forms thereof complexed by said nanofibres, by placing said nanofibres in a regeneration solution.

Another advantage of the nanofibres of the present invention is that the regeneration of the nanofibres can be implemented easily and rapidly.

The regeneration of the nanofibres makes possible the recovery of the metals or elements captured by the nanofibres.

The regeneration of the nanofibres and the recovery of the metals or elements captured can be carried out by any technique known to a person skilled in the art, in particular by changing the pH of the regeneration solution relative to that of the effluent.

In a particular embodiment, said regeneration solution is an acid solution.

The carboxylate groups (—COO$^-$) of polyacrylic acid (PAA) and the pyridine groups in the neutral form of poly(4-vinylpyridine) (P4VP) are the functional groups for complexing copper. On the other hand, the carboxylic groups (—COOH) of polyacrylic acid and the acidified pyridine groups of P4VP are not capable of complexing copper.

By reducing the pH of the regeneration solution, these functional groups pass respectively to the non-functional forms, allowing the release of the metals or elements complexed by these functional groups.

When these are $Cu^{2+}$ ions which are complexed with these functional groups, after being brought into contact with an effluent containing these ions, they can be recovered from the insoluble nanofibres by application of an acid regeneration solution.

The invention relates in particular to a process for extracting the caesium contained in an effluent, comprising the following steps:

(i) placing insoluble nanofibres of the invention, optionally in the form of membranes, obtained from an organic synthesis solution containing polyacrylic acid and calixarene compound B, as described above, in an effluent for a sufficient time;

(ii) recovering the caesium complexed by said nanofibres by placing said nanofibres in an acid regeneration solution.

Advantageously, the regeneration of said membrane has taken place in a regeneration solution with a pH of 1.

BRIEF DESCRIPTION OF THE DRAWINGS

The present invention is further illustrated by the following figures and examples.

FIG. 2: SEM image of polyacrylic acid (PAA) nanofibres with 1 wt. % hexamethylenediamine (HMDA) after a heat treatment at 145° C. for 35 minutes.

FIGS. 3a, 3b, 3c, 3d: SEM (scanning electron microscopy) images of PAA nanofibres after 1 min (3a), 2 min (3b), 3 min (3c), or 5 min (3d) of VUV treatment.

FIG. 5a relates to the kinetic study of the capture of copper (II) ions by nanofibres or by resins. FIG. 5b relates to the comparative study for an adsorption isotherm for a solution laden with copper (II) ions. FIG. 5c relates to the comparative study for an adsorption isotherm for a solution laden with strontium (II) ions.

FIGS. 8a and 8b show respectively the SEM images of PAA nanofibres obtained by electrospinning (FIG. 8a) and by centrifugal spinning (FIG. 8b) after thermal cross-linking and after contact with water.

DETAILED DESCRIPTION

Materials and Methods

Electrospinning

Figure 1A:
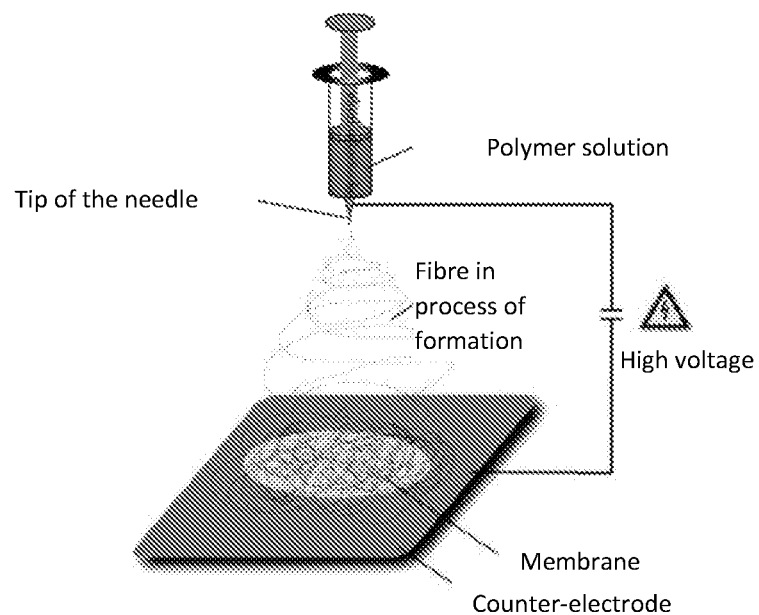
FIG. 1a: Diagram of the electrospinning device, adapted from Greiner and Wendorff, *Angew. Chem. Int. Ed.* 2007, 46, 5670-5703.

Electrospinning is carried out using a traditional device (see the diagram in FIG. 1a adapted from Greiner and Wendorff), a solution of polymer is injected in a needle with an internal diameter varying between 0.1 and 1 mm. The syringe is placed in the syringe driver which is programmed for the chosen flow rate (in mL/h). The needle is connected to a high-voltage generator which furthermore gives it a role as an electrode. The counter electrode (connected to earth) is at a distance varying between 5 and 25 cm. The voltage applied between these two electrodes can vary between 0 and 100 kV depending on the power supply used. By using these very high voltages, very low currents are involved, from a few hundred nA to a few µA.

The nanofibres produced by electrospinning are collected on a collector connected to the counter electrode and the needle at high voltage.

Closing the door of the chamber allows the high voltage supply to start. When the power supply starts, a first potentiostat makes it possible to limit the current, and the second, the voltage applied. For safety reasons, the current potentiostat is set to 25 µA (maximum current) and the second potentiostat is varied in order to reach the desired voltage.

Centrifugal Spinning

Figure 1B:
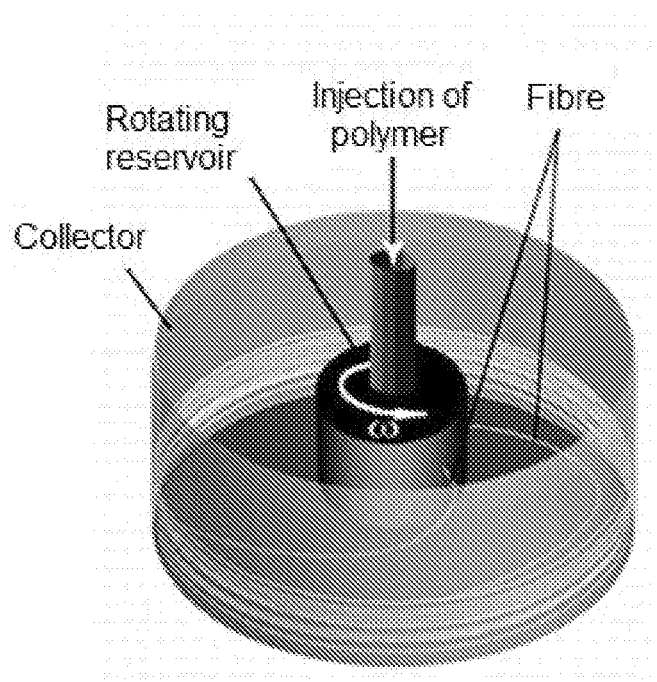
FIG. 1b: Diagram of the centrifugal spinning device, adapted from C. J. Luo et al. *Chem. Soc. Rev.,* 2012, 41, 4708-4735.
Figure 4:
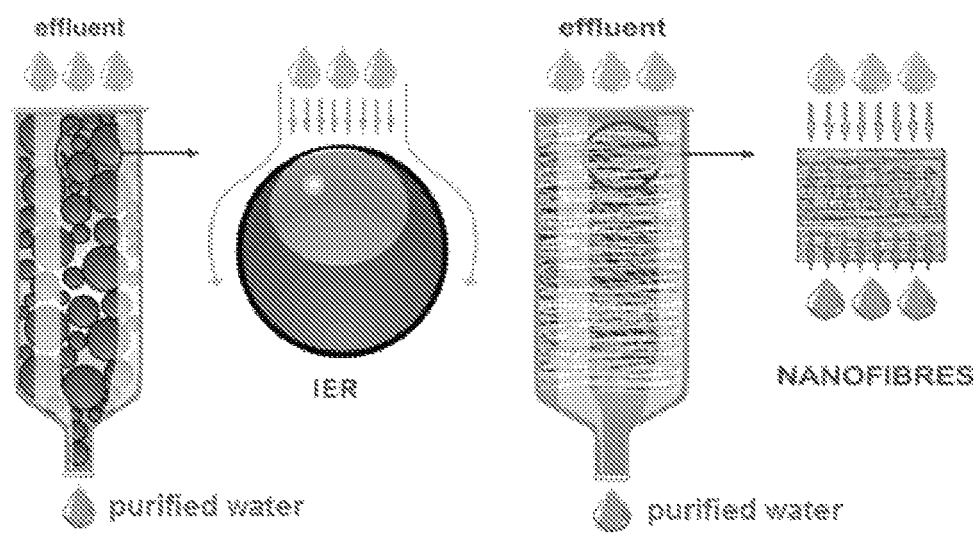
FIG. 4: Diagrammatic view of the treatment of effluents with ion-exchange resins or nanofibres.

Centrifugal spinning is carried out using a standard device (see the diagram in FIG. 1b adapted from C. J. Luo et al.) such as the FORCESPINNING® device of the Cyclone L 1000 M/D type from FibeRio the productivity of which can reach 200 g/hour. The speed of rotation of the spinneret of this device is between 2,000 and 5,000 rpm.

Infra-Red (IR)

Infra-red analyses were carried out on a Bruker Vertex 70 FTIR device in the range 4,000-600 $cm^{-1}$. The spectrometer was used in ATR (Attenuated Total Reflectance) mode with a crystal of diamond type.

On reaching the diamond, the incident IR beam produces an evanescent wave which will be absorbed or changed by the sample (up to 3 µm) then returned in the IR beam. The output IR beam is analysed by a DTGS (Deuterium TriGlycide Sulphate) spectrometer. The resolution is of the order of 2 $cm^{-1}$ and 64 scans are carried out in order to obtain a good signal/noise ratio.

Scanning Electron Microscopy (SEM)

The Scanning Electron Microscopy images were obtained on a JEOL JSM-5510LV. All the analyses were carried out at a low acceleration voltage (between 2 and 4 kV) as the fibres studied are insulators and the risk of damage is high for this type of material. The working distance is set to 8 mm and the acquisition is carried out in SEI mode. A tungsten filament is used as electron gun.

A SEM Zeiss Ultra 55 comprising a field emission gun makes it possible to produce images with an improved contrast and a greater magnification.

Processing the images was carried out with the ImageJ open-source software. Determination of the diameter of the nanofibres was carried out by a statistical study on a minimum of 100 fibres.

Copper Spectrophotometer

For detection of copper and calculation of the concentration of $Cu^{2+}$, a Hanna Instruments spectrophotometer was used. Bicinchoninate is used as colorimetric reagent which emits at 562 nm when it is complexed with copper. The device makes it possible to detect concentrations ranging from 0 to 5 mg/l (±0.02).

Atomic Absorption Spectroscopy (AAS)

Atomic absorption spectroscopy was carried out with a model iCE 3000 Series from Thermo Scientific. AAS is used for determining the concentration of caesium in a synthetic solution. A caesium lamp in emission mode is therefore used in order to obtain good accuracy.

Measurement of the Capacity to Capture Copper

The stabilized membrane is immersed in a beaker containing a given volume of synthetic solution. The stabilized membrane is brought into contact with a dilute soda solution ($NaOH_{aq}$) (pH≈9-10) for 5 minutes in order to decompose the anhydride form in the case of heat treatment and obtain the carboxylate form; then with the synthetic solution of copper for 120 minutes (unless specified otherwise). Before each change of solution, the membrane is dried under vacuum for 30 minutes.

The initial and final copper concentrations of the solutions are measured with the spectrophotometer for copper. Zero is set with the sample without chelating agent. A sachet of bicinchoninate, then the solution to be analysed (dilute solution if exceeding 5 mg/L), are introduced into a cuvette and the detection is started.

The capacity of the material to capture copper (mg/g) (X) is determined by the following formula:

$$X = \frac{C_i - C_f \times V}{W_{membrane}}$$

in which $C_i$ and $C_f$ correspond respectively to the initial mass concentration and to the final copper concentration (in mg/L), V is the volume of the model solution (in L), $W_{membrane}$ is the mass of the membrane (in g).

Measurement of the Capacity to Capture Caesium

The method described above for measuring the capacity to capture copper is applicable for measuring the capacity of a material to capture caesium. The stabilized membrane is brought into contact with the synthetic solution of the element to be studied for 30 minutes. The initial and final concentrations of Cs of the solutions are measured by atomic absorption spectrometry. The formula used for calculating the capacity for copper is valid for Cs.

Example 1. Extraction of Copper by Insoluble PAA Nanofibres Produced by Electrospinning and Stabilized by a Cross-Linking Agent 1) Preparation of Polymer Solutions Two types of polyacrylic acid (PAA) were used, their characteristics are as follows:

PAA from Fluka: pure PAA (analytical standard), Mw=130,000 g·mol$^{-1}$, white powder PAA 35% $H_2O$: PAA diluted to 35% in $H_2O$, Mw=250,000 g·mol$^{-1}$, viscous colourless liquid.

The $pK_A$ of the PAA is 4.25.

The polyacrylic acid (PAA) is diluted to 20-25 wt. % in deionized water in order to obtain a viscous solution. Hexamethylene diamine (HMDA) is added as cross-linking agent at 15 wt. % relative to the mass of PAA.

2) Manufacture of Nanofibres by Electrospinning

This solution is injected into an electrospinning device in order to produce soluble nanofibres. The voltage applied is situated between 15 and 20 kV at a distance between the solution and the collector of 10-20 cm. Under these conditions, PAA nanofibres with diameters of 100-130 nm are obtained. The nanofibres obtained have a smooth appearance and are well-defined. The nanofibres together form a white membrane with a diameter of 5 to 10 cm and from 30 to 150 mg.

3) Stabilization of the Membranes by Heat Treatment

Heat treatment is carried out at 130-145° C. for 25-50 min. After stabilization the membranes are stable in aqueous media for several months.

Swelling of the membrane is noted when it is immersed in water. This phenomenon shows the hygroscopic character of the PAA which is a considerable advantage for the capture of the dissolved elements. The heat treatment has an impact on the morphology of the nanofibres (FIG. 2).

4) Extraction of $Cu^{2+}$

Synthetic solutions of $Cu^{2+}$ of 5-500 mg/L are prepared from $CuSO_4.5H_2O$ in deionized water. As the solutions of $CuSO_4$ are slightly acidic, it is necessary to adjust the pH to 6 with an aqueous solution of sodium hydroxide.

The membrane of PAA nanofibres is immersed in the solution of $Cu^{2+}$ (5-500 mg/L) and in less than a minute turns blue, which proves that the copper has become incorporated into the PAA nanofibres. After immersion for 2 h in the solution, the membrane is saturated. The final concentration of $Cu^{2+}$ in said solution is measured with the Copper spectrophotometer and a capacity of 280 mg/g is obtained, which is much greater than those obtained with the nanofibres described in the prior art.

5) Regeneration of the Membranes

A treatment in an acid medium (1M HCl) instantly causes the membrane to lose its colour and return to its white colouring. The regeneration is 100% effective.

It is possible to carry out several cycles of copper capture/release.

Example 2. Extraction of Copper by Insoluble PAA Nanofibres Produced by Electrospinning in an Alcoholic Medium and Stabilized by a Cross-Linking Agent 1) Preparation of the Synthesis Solution PAA Fluka: pure PAA (analytical standard), Mw=130,000 g·mol−1, white powder

HMDA 15%

Concentrated nitric acid $HNO_3$

Polyacrylic acid, with a molecular weight ($M_W$) ranging from 130,000 to is diluted to 10 wt. % in ethanol. A reflux assembly makes it possible to facilitate dissolution. The solution obtained is colourless and viscous. Nitric acid is added in order to obtain a pH of 2. Hexamethylene diamine (HMDA) is added as cross-linking agent at 15 wt. % relative to the mass of PAA.

2) Production of the Nanofibres by Electrospinning

This solution is injected into an electrospinning device in order to manufacture the nanofibres. The voltage applied is situated between 15 and 20 kV at a distance between the solution and the collector of 10-20 cm. Under these conditions, PAA nanofibres with a diameter of 150 nm are obtained. The nanofibres obtained have a smooth appearance and are well-defined. The nanofibres together form a white membrane from 5 to 10 cm diameter and from 30 to 150 mg.

3) Stabilization of the Membranes by Heat Treatment

Heat treatment is carried out at 130-145° C. for 25-50 min. After stabilization the membranes are stable in aqueous media for several months.

4) Extraction of $Cu^{2+}$

Synthetic solutions of $Cu^{2+}$ of 5-500 mg/L are prepared from $CuSO_4.5H_2O$ in deionized water. As the solutions of $CuSO_4$ are slightly acidic, it is necessary to adjust the pH to 6 with an aqueous solution of sodium hydroxide.

The membrane of PAA nanofibres is immersed in the solution of $Cu^{2+}$ (5-500 mg/L) and in less than a minute turns blue, which proves that the copper has become incorporated into the PAA nanofibres. After immersion for 2 h in the solution, the membrane is saturated. The final concentration of $Cu^{2+}$ in said solution is measured with the Copper spectrophotometer and a capacity of 230 mg/g is obtained.

5) Regeneration of the Membranes

A treatment in an acid medium (1M HCl) instantly causes the membrane to lose its colour and return to its white colouring. The regeneration is 100% effective.

It is possible to carry out several cycles of copper capture/release

Example 3: Extraction of Copper by the Insoluble PAA Nanofibres Produced by Electrospinning and Stabilized by VUV Radiation Manufacture of soluble nanofibres of PAA is the same as that described in Example 1.

Stabilization of the membrane is carried out by VUV radiation.

The membrane of nanofibres to be stabilized is placed in a VUV (Vacuum Ultra Violet) irradiation device at a distance of 4-8 cm from the source.

In order to prevent the formation of ozone, flushing with nitrogen ($N_2$) is carried out for 15 minutes.

Irradiation is carried out at 172 nm under flushing with $N_2$ for a duration varying between 1 and 5 minutes.

This physical treatment makes it possible to not alter the morphology of the nanofibres while allowing a cross-linking and therefore a stabilization in the medium of use (water, alcohols, etc.).

The spectroscopic (IR) and structural (SEM) analyses produce similar results before and after VUV treatment (for times varying from 1 to 5 minutes). FIGS. 3a, 3b, 3c, 3d respectively show the nanofibres after 1, 2, 3 and 5 minutes of VUV treatment. There is no notable change in morphology (shape, diameter) observed.

The method for the extraction of copper is the same as that described in Example 1. The performance of such a membrane for copper capture is 25 mg/g.

The regeneration of the membrane is implemented according to the same method as that described in Example 1 and also reaches 100% effectiveness.

Example 4: Extraction of Traces of Caesium by PAA Nanofibres Incorporating, by Solvent Impregnation, Calixarenes Selective for Caesium 1) Preparation of the Mixed Polymer—Calixarene Solutions a) Preparation of the Polymer Solution Polyacrylic acid, with molecular weight (Mw) ranging from 130,000 to 250,000 g/mol is diluted to 10 wt. % in ethanol. A reflux assembly makes it possible to facilitate dissolution. The solution obtained is colourless and viscous.

b) Synthesis and Treatment of Calixarene

The calixarene used is compound B described in the application WO 2013/124831.

The pure calixarene is then dissolved in tetrahydrofuran (THF).

c) PAA—Calixarene Mixtures

Various solutions can be prepared from the solution of PAA in ethanol and of calixarene in THF. By modifying the mixture the proportion of calixarene with respect to PAA is varied. Solutions can thus be prepared having as a relative proportion of calixarene from 10 to 70 wt. % relative to the PAA.

2) Production of Nanofibres by Electrospinning

These solutions are respectively injected into an electrospinning device in order to produce soluble nanofibres. The voltage applied is comprised between 15 and 20 kV at a distance between the solution and the collector of 10-20 cm. Under these conditions, PAA nanofibres with diameters of 200-300 nm are obtained. The nanofibres obtained have a smooth appearance and they are well-defined. The nanofibres together form a white membrane with a diameter of 5 to 10 cm and from 30 to 150 mg.

3) Stabilization of the Membranes by VUV Radiation

The membrane obtained is placed in a VUV (Vacuum Ultra Violet) irradiation device at a distance of 4-8 cm from the source. In order to prevent the formation of ozone, flushing with nitrogen ($N_2$) is carried out for 15 minutes.

Irradiation is carried out under flushing with $N_2$ for a duration varying between 1 and 5 minutes.

This physical treatment makes it possible to not alter the morphology of the nanofibres while allowing a cross-linking and therefore a stabilization in the medium of use (water, alcohols, etc.)

4) Extraction of Traces of Caesium in a Medium Containing Interfering Ions

The media to be treated have a very low concentration of caesium in sea water (containing $Na^+$ ions) which requires the use of a calixarene that is selective for caesium.

In order to carry out the extraction tests, the model solution used contains $Na^+$ ions at $10^{-1}$ M and $Cs^+$ ions at $10^{-4}$ M.

The membrane of PAA nanofibres containing calixarenes is introduced into a volume of this selectivity solution. The extraction time is generally 30 minutes.

The initial and final concentrations of caesium are measured by an atomic absorption spectrometer as described in the section "Materials and methods". A 95% reduction in the concentration of caesium is measured.

By way of comparison, a membrane composed of PAA nanofibres (with no added calixarene) only allows a 6% reduction in caesium.

5) Regeneration of the Membranes by Acid Treatment

A treatment of the membranes containing calixarenes having complexed caesium with an aqueous solution of HCl acid at 5M allows all of the trapped caesium to be released.

Example 5: Study of the Performances of Insoluble PAA Nanofibres 5.1/ Kinetic Study of the Capture of Copper (II) Ions A kinetic study was carried out in comparison with the ion exchange resin Amberlite™ IRC 748I.

The same solution of copper salt at 2 mg/l is placed respectively in two pillboxes of equal capacity. The volume of the solution is 50 ml. 250 ml of copper salt solution is prepared by introducing 157.5 mg of $CuSO_4$ into a 250 ml measuring flask and making up to the mark with distilled water.

The following are placed respectively in these pillboxes: 127 mg of sorbent materials, namely the ion exchange resin (Amberlite IRC 748I resin from Supelco) and the membranes of the present invention produced from an initial synthesis solution containing 25% polyacrylic acid (PAA; molecular weight $2.5 \times 10^5$) by weight relative to the synthesis solution, and 15% hexamethylenediamine by weight relative to the PAA as cross-linking agent.

The resin Amberlite™ IRC 748I from Supelco is designed to capture the divalent heavy metals such as copper, cobalt, nickel or zinc with amine-containing dicarboxylic groups.

In the two materials, it is the carboxylic groups that capture the metal salts.

Moderate magnetic stirring of 10 revolutions per second is immediately started after putting the sorbent materials into solution.

1 ml of the solution of copper is taken respectively at 2, 5, 20, 50, 80 and 120 minutes, using a micropipette. The samples are analysed by atomic absorption.

The adjustment parameters of the device (ICE 3000 of Thermo Scientific) for the analysis are the following:
 Measurement mode: absorption
 Flame: air-acetylene
 Burner height: 7 mm
 Flow rate: 1.1 L/min.

Figure 5A:
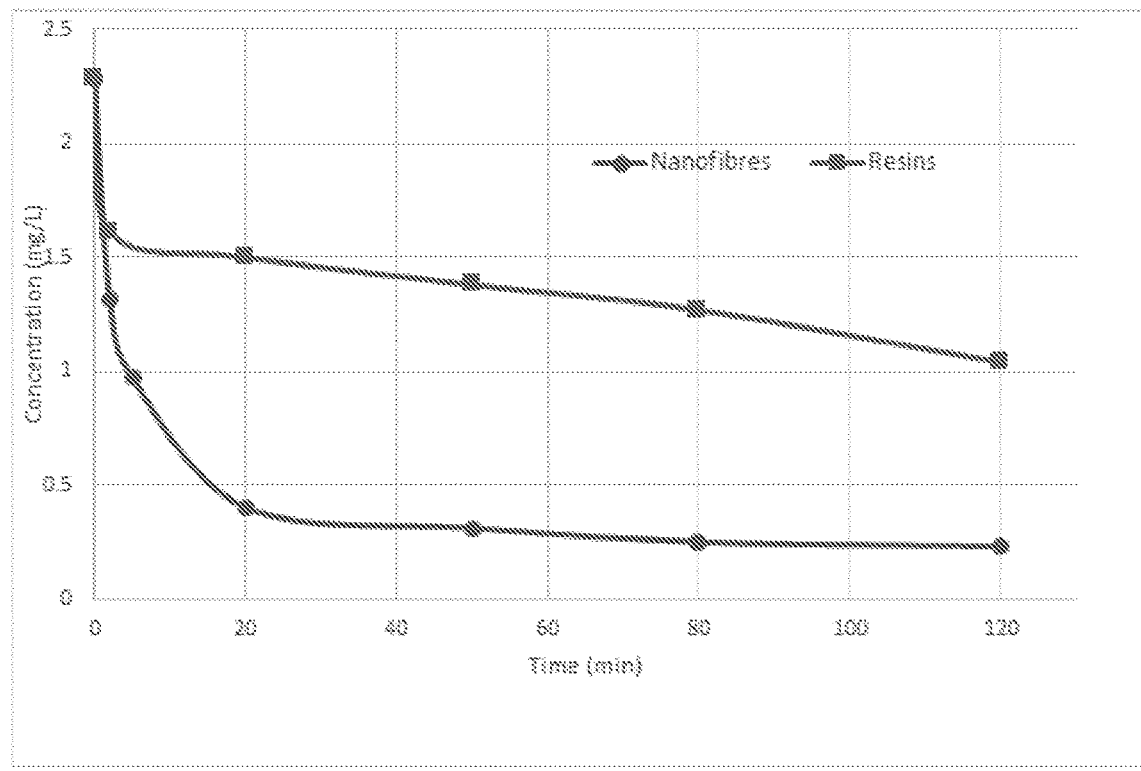
FIGS. 5a, 5b and 5c: Comparison of performance between PAA nanofibres of the invention and Amberlite IRC 748I ion-exchange resin from SUPELCO.

The results of the analyses are given in FIG. 5a.

The results very clearly show that the performance of the nanofibres is superior to that of the ion exchange resins (IER). As early as 2 minutes after bringing the Cu solution into contact with the sorbent materials, the capture capacities of the nanofibres of the invention are very significantly greater than those measured with the IERs. These results evidently demonstrate that it is much quicker to totally impregnate a nanofibre with a diameter of 0.3 μm than a bead of resin with a diameter of 500 μm, despite all the efforts by the manufacturers of the IERs to improve the circulation of liquid inside the beads.

These results can be explained by the diffusion equation given below:

$$\tau = l^2/Ds,$$

in which τ represents the diffusion time, l represents the dimension of the materials and Ds is a diffusion coefficient.

The kinetics of capture by the beads of IER are limited by the kinetics of diffusion of the liquid within the beads (Ds), while the kinetics of capture by the nanofibres of the invention are driven by the distance to be covered (l). Given the dimensions of the nanofibres, this distance is very short and it therefore corresponds to short diffusion times.

Given the advantageous capture capacities of the nanofibres of the invention with respect to the IERs, it is therefore also possible, using the sorbent materials, to reduce the loads of materials in a column for the same effectiveness.

5.2/ Adsorption Isotherm for a Solution Laden with Copper (II) Ions

In order to determine the properties of the PAA nanofibres described in Example 5.1, an adsorption isotherm was produced for the Copper (II) ions. The operating conditions are the following:
 pH: 3.8-4.6
 adsorption temperature: 20° C.
 volume of the bed: 2 mL
 height of resin column: approximately 2.7 cm.

Figure 5B:
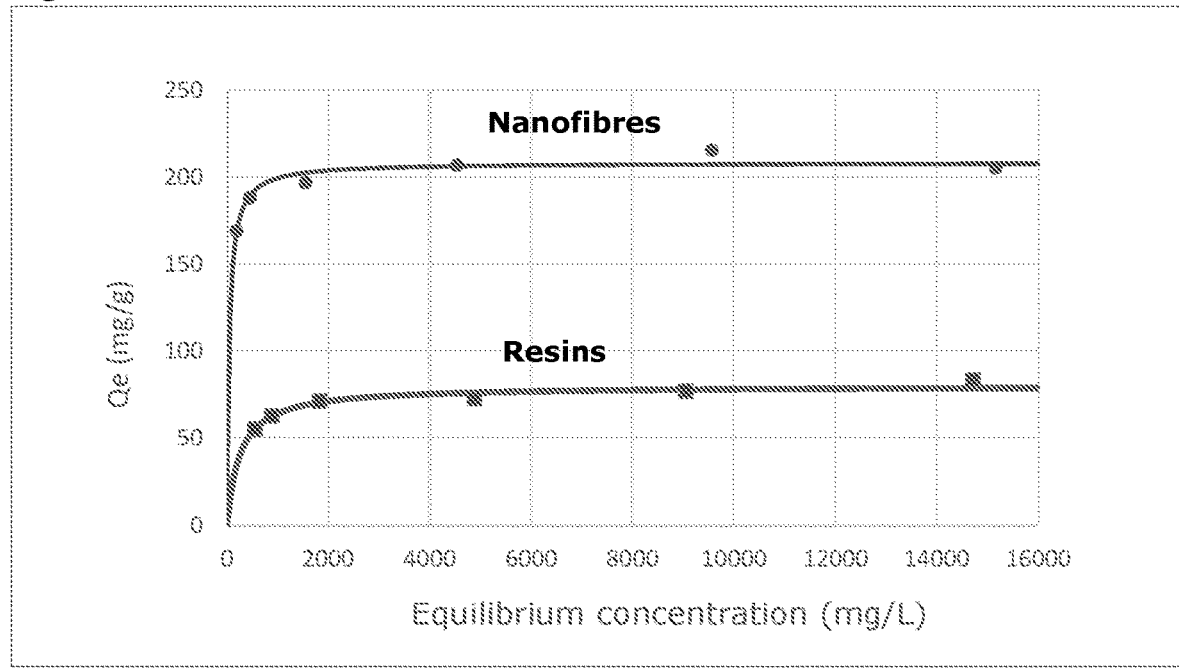

The maximum capacity ($Q_{max}$) is determined as 208 mg of Copper (II)/g of nanofibres of the invention. By way of comparison and under the same conditions, the ion exchange resin Amberlite™ IRC748I, specialist product for the capture of metals, has a $Q_{max}$ of 79 mg of Copper (II)/g of resin. The nanofibres according to the invention therefore offer much higher capture performances (FIG. 5b).

Another study shows that the presence of a background salt (NaCl at 0.1 mol/L) does not modify the adsorption properties of the material.

5.3/ Adsorption Isotherm for a Solution Laden with Strontium (II) Ions

Figure 5C:
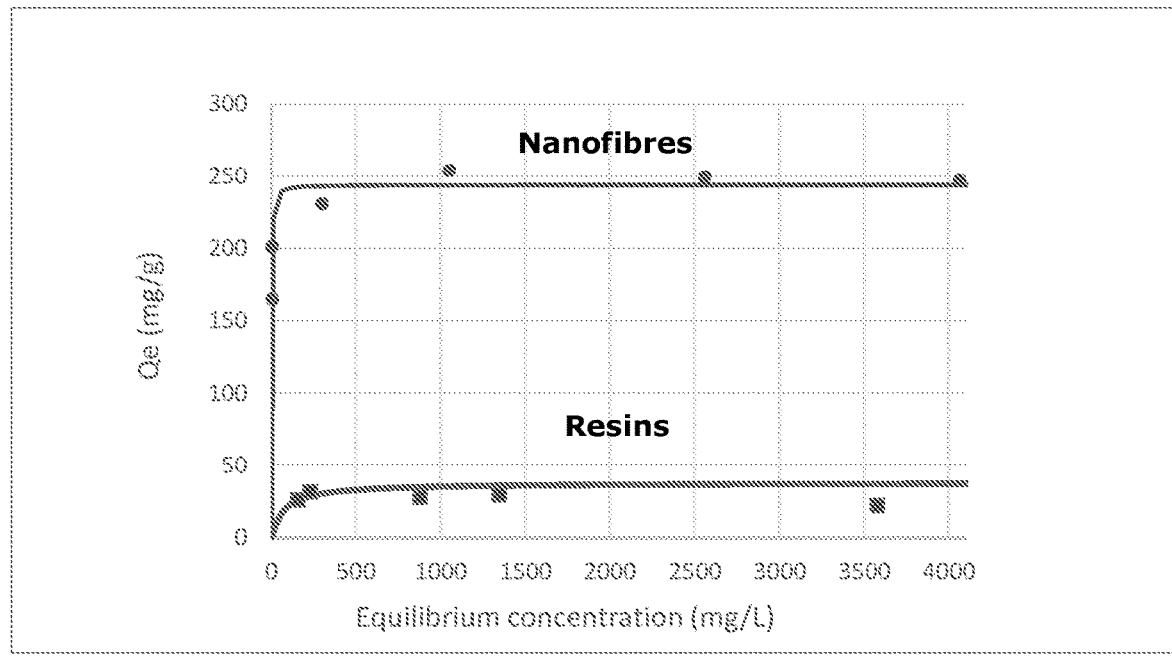

Strontium (II) ions can be captured by the nanofibres of the invention described in Example 5.1. According to the absorption isotherm obtained, the maximum bearing capacity ($Q_{max}$) reached is 244 mg of Strontium (II)/g for the nanofibres of the invention, while, under the same operating conditions, the ion exchange resin Amberlite™ IRC748I has a $Q_{max}$ of 38 mg of Strontium (II)/g of resin (FIG. 5c).

The operating conditions are the following:
 pH: 5
 adsorption temperature: 20° C.
 volume of the bed: 1.9 mL
 column height: 1.5 cm.

5.4/ Study of the Breakthrough of Copper (II) Ions

Figure 5D:
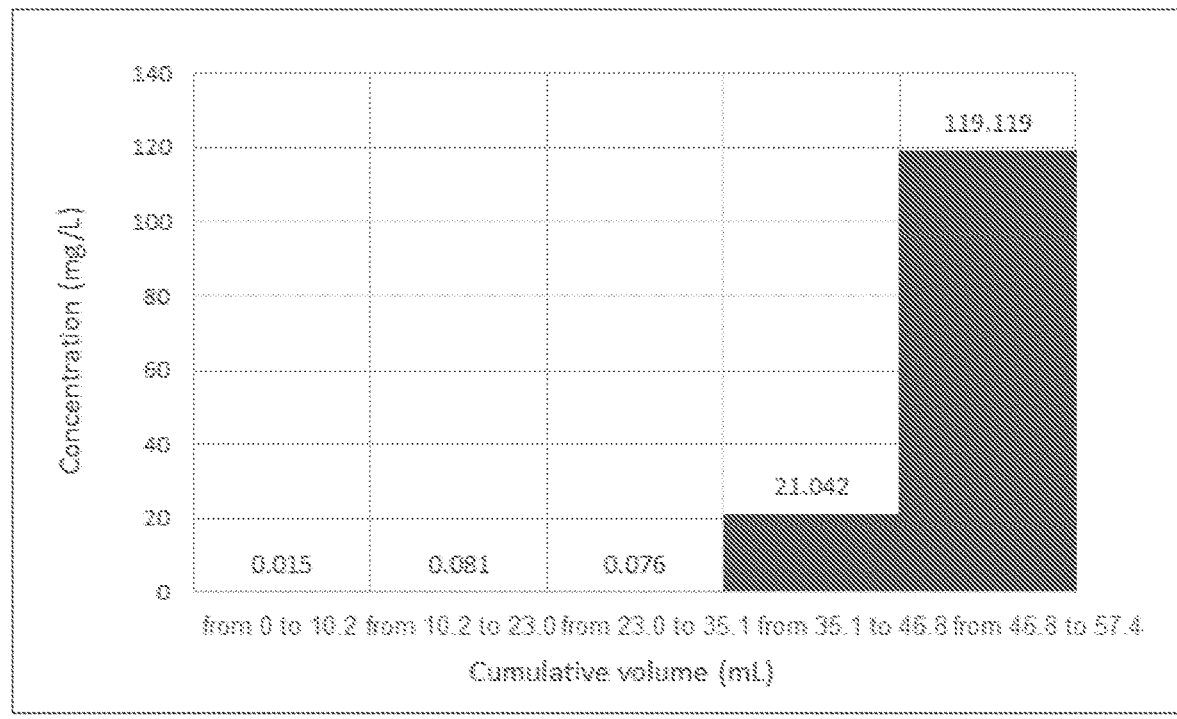
FIGS. 5d and 5e show the results of the breakthrough studies of the PAA nanofibres of the invention, carried out with copper (II) ions in highly concentrated (FIG. 5d) and weakly concentrated (FIG. 5e) media.
Figure 5E:
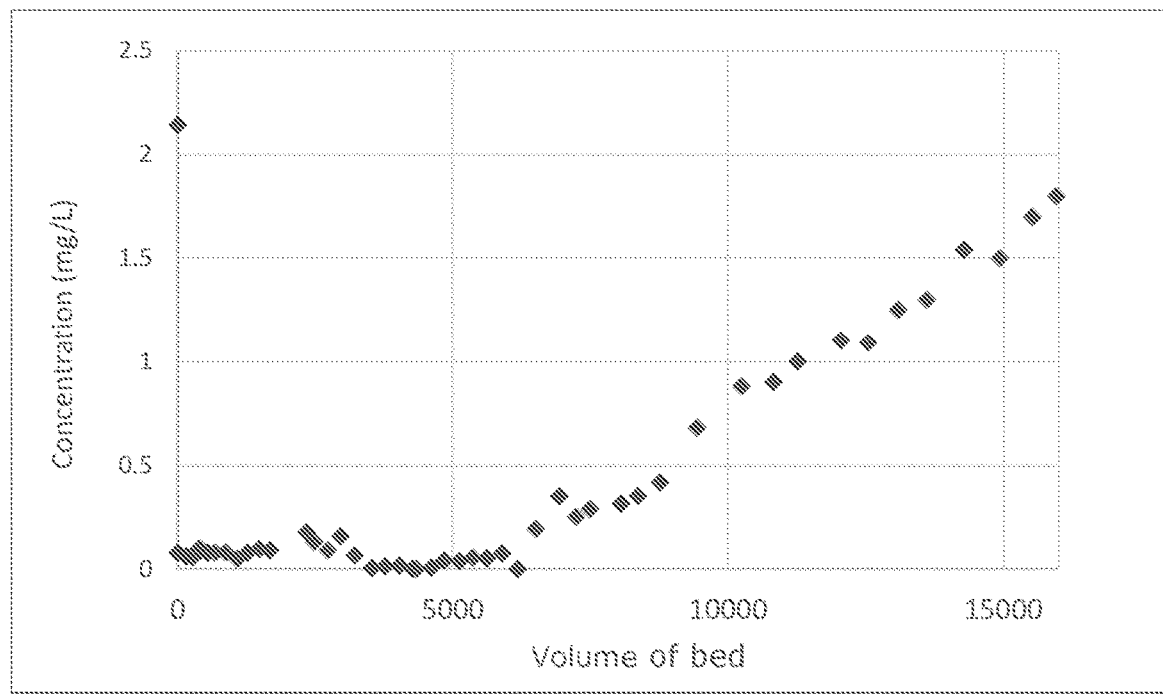

The studies of breakthrough of the PAA nanofibres described in Example 5.1 are carried out with Copper (II) ions in highly concentrated (1 g/L) and weakly concentrated (2 mg/L) media. The results (FIGS. 5d and 5e) show that the nanofibres of the invention comply with the standards of the current discharge legislation with values before breakthrough lower than 0.1 mg/L, while the standards recommend limit values for the concentration of Copper (II) ions between 0.5 and 2 mg/L (Circular DGS/SD 7 A n°2004-45 of 5 Feb. 2004 relating to the control of the parameters for Lead, Copper and Nickel in water intended for human consumption).

The operating conditions for the study in a medium with a high concentration of Copper (II) ions are the following:
 pH: 4.6
 concentration of Copper (II) ions=1.0 g/L
 temperature: 20° C.
 volume of the bed: 2.12 mL
 height of resin column: 2.7 cm.

The operating conditions for the study in a medium with a low concentration of Copper (II) ions are the following:
 concentration of Copper (II) ions=2.0 mg/L
 temperature: 20° C.
 volume of the bed: 2.30 mL
 height of resin column: 2.7 cm.

5.5/ Bearing Capacity in the Presence of Interfering Substances

Depending on the effluent, different interfering substances can disturb the stage of adsorption of the Copper (II) ions by the nanofibres described in Example 5.1. Proportions of Sodium (I) (Nat) and Calcium (II) ($Ca^{2+}$) ions were tested in order to determine the bearing capacity ($Q_e$) of the nanofibres of the invention in a medium with interfering substances (Table 1).

TABLE 1

| Metal ion | Interfering substance | Ratio | Bearing capacity $Q_e$ (mg/g) |
|---|---|---|---|
| $Cu^{2+}$ | — | — | 169 |
| $Cu^{2+}$ | $Na^+$ | $Cu^{2+}/Na^+$ 1:10 | 169 |

TABLE 1-continued

| Metal ion | Interfering substance | Ratio | Bearing capacity $Q_e$ (mg/g) |
|---|---|---|---|
| $Cu^{2+}$ | $Na^+$ | $Cu^{2+}/Na^+$ 1:500 | 146 |
| $Cu^{2+}$ | $Ca^{2+}$ | $Cu^{2+}/Ca^{2+}$ 1:1 | 158 |
| $Cu^{2+}$ | $Ca^{2+}$ | $Cu^{2+}/Ca^{2+}$ 1:100 | 70 |

The operating conditions are the following:
initial concentration of Copper (II) ions: 0.7 g/L
adsorption temperature: 20° C.
volume of the bed: 2 mL
column height: 2.7 cm.

5.6/ Bearing Capacity for Different Metal Ions

The bearing capacity ($Q_e$) for several metal ions was determined with the following selectivity (dependent on the concentration conditions, pH, the presence of interfering substances, etc.): $Ca^{2+}<Cr^{3+}<Eu^{3+}<Fe^{2+}<Zn^{2+}<Ni^{2+}<Co^{2+}<Cd^{2+}<Cu^{2+}<Pb_{2+}<Mg^{2+}<Sr^{2+}$.

The operating conditions are the following:
initial concentration of metal ions: approximately 1 g/L (20 g/L for $Eu^{3+}$)
adsorption temperature: 20° C.
volume of the bed: 2 mL
column height: 2.7 cm.
The results are given in Table 2 below.

TABLE 2

| v | pH | Bearing capacity $Q_e$ (mg/g) |
|---|---|---|
| $Ca^{2+}$ | 5.0 | 80 |
| $Cd^{2+}$ | 5.0 | 186 |
| $Co^{2+}$ | 5.0 | 183 |
| $Cr^{3+}$ | 4.0 | 83 |
| $Cu^{2+}$ | 5.0 | 188 |
| $Eu^{3+}$ * | — | 105 |
| $Fe^{2+}$ | 4.0 | 121 |
| $Mg^{2+}$ | 5.5 | 215 |
| $Ni^{2+}$ | 5.0 | 147 |
| $Pb^{2+}$ | 4.0 | 195 |
| $Sr^2$ | 5.0 | 254 |
| $Zn^{2+}$ | 5.0 | 124 |

5.7/ Method for the Regeneration of the Nanofibres of the Invention

Figure 5F:
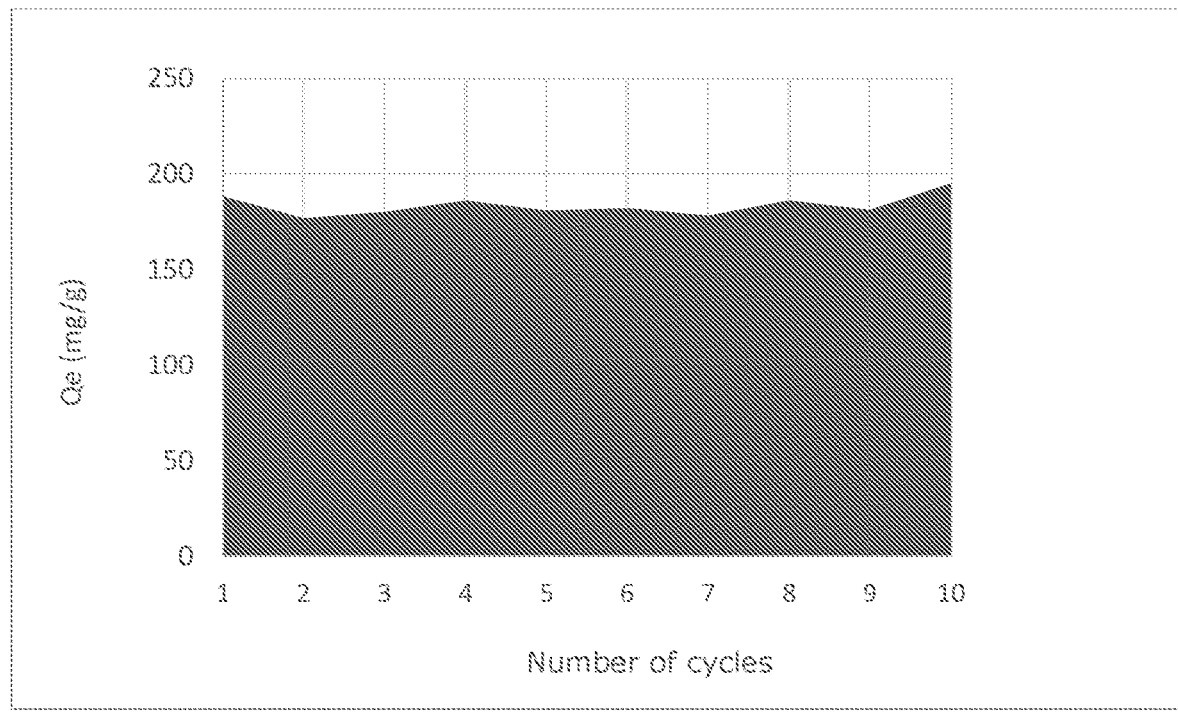
FIG. 5f shows the result of the regenerability study of the nanofibres of the invention of PAA.
Figure 6A:
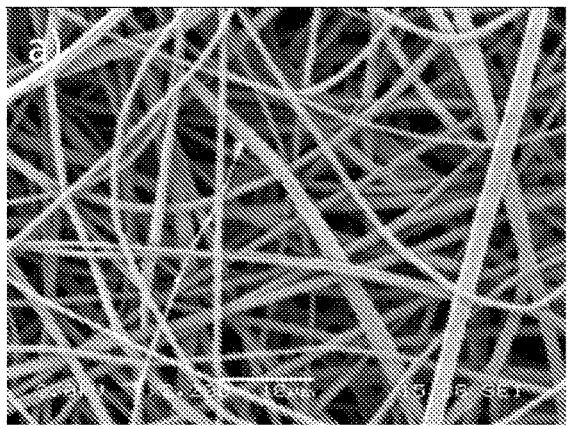
FIGS. 6a and 6b respectively show the SEM images of PAA nanofibres obtained by electrospinning (FIG. 6a) and by centrifugal spinning (FIG. 6b) before thermal cross-linking.
Figure 6B:
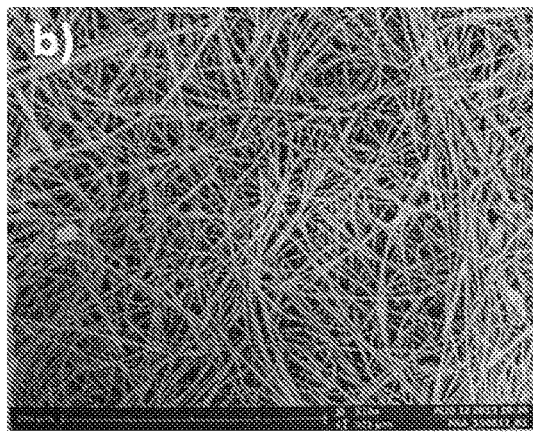
Figure 7A:
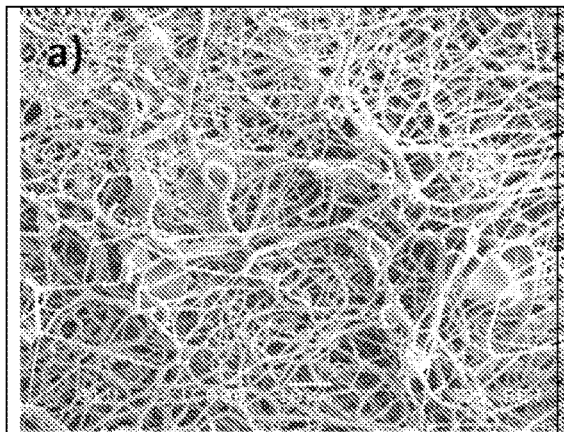
FIGS. 7a and 7b show respectively the SEM images of PAA nanofibres obtained by electrospinning (FIG. 7a) and by centrifugal spinning (FIG. 7b) after thermal cross-linking.
Figure 7B:
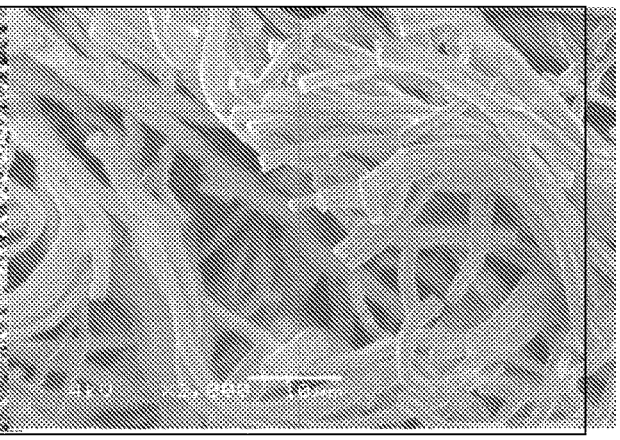

The use of 2 to 4 volumes of the bed of a solution of hydrochloric acid at 3.1% (corresponds to 1 mol/L) allows the regeneration of the PAA nanofibres described in Example 5.1 (90-100%). Several cycles of saturations/regenerations were carried out in order to demonstrate the maintenance of the performances of the material (FIG. 5f).

The operating conditions are the following:
pH: 4.6
concentration of Copper (II) ions: 1 g/L
adsorption temperature: 20° C.
volume of the bed: 2.12 mL
column height: 2.7 cm.

Example 6: Comparative Study of Nanofibres Obtained by Electrospinning or by Centrifugal Spinning The synthesis solution for producing nanofibres by electrospinning or centrifugal spinning is a solution at pH=3.7 containing 25% polyacrylic acid (PAA; molecular weight $2.5 \times 10^5$) by weight relative to the synthesis solution, and 15% hexamethylenediamine by weight relative to the PAA as cross-linking agent.

The nanofibres are produced respectively by the electrospinning technique and the centrifugal spinning technique according to the methods described in the section "Materials and methods".

The two types of fibres produced are thermally cross-linked by heating at 145° C. for 25 minutes. The comparative results for the two types of nanofibres obtained by electrospinning and by centrifugal spinning are illustrated in FIGS. 6a, 6b, 7a, 7b, 8a and 8b.

The results show that the two types of nanofibres have similar structures and behave in the same way on contact with water.

Moreover, infra-red analysis on these two types of nanofibres confirms that the two materials are identical from a chemical point of view.

Example 7: Extraction of Copper by Insoluble PAA Nanofibres Produced by Centrifugal Spinning and Stabilized by Heat Treatment The PAA nanofibres described in Example 6 and produced by centrifugal spinning are used to extract the $Cu^{2+}$ from an aqueous solution.

A synthetic solution of $Cu^{2+}$ at 2.16 mg/L was prepared from $CuSO_4.5H_2O$ in deionized water.

0.129 g of PAA nanofibres obtained by centrifugal spinning according to the method described previously are brought into contact with 50 mL of the solution of $Cu^{2+}$. After two hours, the concentration of $Cu^{2+}$ in the solution is 0.27 mg/L. That is to say, an 87% reduction in the concentration by simply bringing into contact.

By way of comparison, the same quantity of PAA nanofibres obtained by electrospinning is also brought into contact for 2 hours with 50 mL of the solution of $Cu^{2+}$. The concentration of $Cu^{2+}$ after the extraction is 0.23 mg/L. These results show that the performance of the nanofibres obtained by centrifugal spinning is equivalent to that of the nanofibres obtained by electrospinning.

The same experiment was carried out with ion exchange resins, after contact for 2 hours; the equilibrium concentration is 1.04 mg/L.

In another comparative experiment, a synthetic solution of $Cu^{2+}$ at 5.2 mg/L was prepared from $CuSO_4.5H_2O$ in deionized water.

0.112 g of PAA nanofibres obtained by centrifugal spinning are brought into contact with 50 mL of the solution of $Cu^{2+}$. After two hours, the concentration of $Cu^{2+}$ of the solution is 0.69 mg/L, i.e. also a reduction in the concentration of the order of 87%.

The same experiment was carried out with 0.1036 g of the nanofibres of polyacrylonitrile obtained by centrifugal spinning. After contact for 2 hours, the concentration of $Cu^{2+}$ in the solution is 4.78 mg/L, namely a reduction in the concentration of just 8%.

These comparative results show that only the use of an initial hydrophilic and water-soluble polymer makes it possible to achieve a desired reduction in the concentration of $Cu^{2}\pm$.

Example 8: Study Relating to the Choice of Molecular Weights for Optimizing the Stabilization of PAA Nanofibres Two sources of polymers are used. A source of PAA with a molecular weight of 250,000 (Sigma Aldrich 416002—35 wt. % in $H_2O$) and a source of PAA polymer of 2,000 (Sigma Aldrich 535931—50 wt. % in $H_2O$).

These two sources of polymer are used to make a solution at 25% PAA relative to the total mass and 15% hexamethylenediamine by weight relative to the PAA as cross-linking agent.

In order to assess the relationship between the molecular weight of the PAA and the cross-linking rate, two thin films of PAA are made on gilded glass slides. The solution of PAA of mass 2,000 does not allow fibres to be produced.

For these two films a heat treatment at 200° C. for 20 min is carried out. These films are left to cool naturally then immersed for an hour in a solution of water at a pH between 8 and 9 by the addition of soda. These basic solutions are very solubilizing for the PAA.

After rinsing with distilled water and with ethanol only the PAA film of mass 250,000 is still present on the surface. On the other hand, the PAA film of mass 2,000 is no longer visible, as it has dissolved.

This example demonstrates that the effectiveness of the cross-linking for a given level of cross-linking agent is very varied. A polymer having a relatively high molecular weight makes it possible to have a better cross-linking effectiveness.

The invention claimed is:
1. Nanofibres that are insoluble and swellable in an essentially aqueous effluent, and capable of being obtained by the process comprising the following steps:
   (a) obtaining the nanofibres by electrospinning or centrifugal spinning from a synthesis solution, said synthesis solution comprising:
   (i) at least one hydrophilic and water-soluble initial polymer selected from the group comprising:
      polyacrylic acid or the copolymers of polyacrylic acid;
      the anionic derivatives of polystyrene;
      the cationic derivatives of polystyrene,
      poly(4-vinylpyridine) or derivatives thereof,
      polyvinyl alcohol or hydrophilic derivatives thereof,
      polyvinylpyrrolidone, derivatives thereof, or copolymers thereof, or
      a mixture thereof;
   said hydrophilic and water-soluble initial polymer having a molecular weight from $1\times10^4$ to $1.5\times10^6$, the hydrophilic and water-soluble initial polymer content in the synthesis solution being from 5 to 50 wt. %, relative to the synthesis solution,
   (ii) at least one additive selected from:
      a cross-linking agent from 0.05 to 40 wt. % relative to the hydrophilic and water-soluble initial polymer,
      a complexing molecule from 1-40 wt relative to the hydrophilic and water-soluble initial polymer, said complexing molecule being selected from: a calixarene, a crown ether, or
      a mixture thereof;
   (b) stabilizing the nanofibres obtained in step (a) to obtain nanofibres that are insoluble but swellable in an essentially aqueous effluent;
   said nanofibres having a cross-linking rate comprised between 5 and 40%,
   wherein said cross-linking agent is selected from the group comprising:
      a diazide, in particular diazidostilbene,
      a diamine, in particular hexamethylenediamine,
      a hydrophilic polymer selected from the group comprising a polyethylene glycol, a polyhydroxyethyl methacrylate, polyvinylpyrrolidone, derivatives thereof or copolymers thereof,
      a ($C_1$-$C_{10}$) dibromoalkane, in particular 1,4-dibromobutane
      a dibromo-p-xylene,
      a ($C_1$-$C_{10}$) diiodoalkane in particular 1,4-diiodobutane,
      a ($C_1$-$C_{10}$) dichloroalkane in particular 1,4-dichlorobutane, and
      a calixarene of Formula I

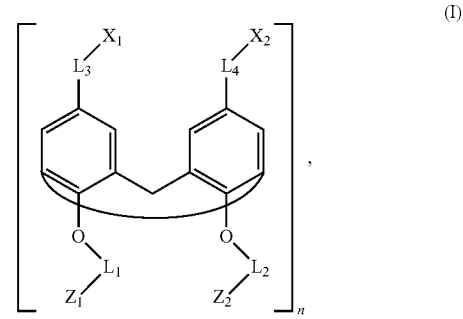

in which:
   $X_1$ and $X_2$ each represent independently of each other H or a

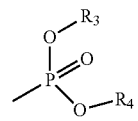

group, in which $R_3$ and $R_4$ each represent, independently of each other, H or a ($C_1$-$C_8$) alkyl group, provided that $X_1$ and $X_2$ do not simultaneously represent H;
   $L_1$, $L_2$, $L_3$ and $L_4$ are spacer groups, selected independently of each other from the group consisting of a ($C_3$-$C_{10}$) cycloalkylenyl, O, NH, —$(CH_2)_q$, q being an integer from 1 to 12;
   $Z_1$ and $Z_2$ each represent, independently of each other, a functional group selected from an optionally protected amine, F, Cl, Br, I, OH, C(=O)H, C(=O)Hal, an aryl group or a substituted aryl group, such as a tosyl, a diazonium group, an aromatic heterocycle such as a pyrrolyl, furyl, thienyl, or pyridinyl group, an optionally protected sulphate or sulphonate group,
   n is an integer from 1 to 10; or
   a calixarene of Formula II

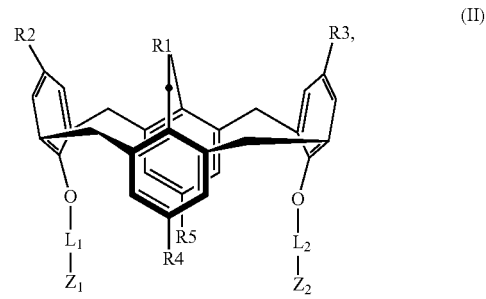

in which:
   R1 is selected from —$X(C_2H_4X)_m$—, or —$X(C_2H_4X)_{p/2}YX(C_2H_4)_{p/2}$—, X being selected independently from O and/or N, m being equal to 3, 4, 5 or 6, p being equal to 2 or 4, Y being a ($C_3$-$C_{10}$) cycloalkylene or a ($C_6$-$C_{10}$) arylene; and $R_2$ to $R_5$ are selected independently of each other from H, or a ($C_1$-$C_6$) alkyl;

$L_1$ and $L_2$ are spacer groups, selected independently of each other from a ($C_3$-$C_{10}$) cycloalkylene or a ($C_3$-$C_{10}$) arylene, —$(CH_2)_q$—, q being an integer from 1 to 12;

$Z_1$, $Z_2$ are grafting groups, selected independently of each other from F, Cl, Br, I, —$OHNH_2$, —C(=O)Hal, —C(=O)OH, an aryl group or a substituted aryl group, such as a tosyl, a diazonium group, an aromatic heterocycle such as a pyrrolyl, furyl, thienyl, or pyridinyl group, an optionally protected sulphate or sulphonate group.

2. The insoluble and swellable nanofibres according to claim 1, wherein the stabilization of the nanofibres obtained by electrospinning or centrifugal spinning is carried out by a heat treatment or by radiation with ultra-violet rays of the VUV (Vacuum Ultra-Violet) or UV type or by visible radiation.

3. The insoluble and swellable nanofibres according to claim 1, wherein the nanofibres are obtained by the process comprising the step of:
stabilizing the nanofibres by a heat treatment in order to obtain nanofibres that are insoluble and swellable in an essentially aqueous effluent.

4. The insoluble and swellable nanofibres according to claim 3, wherein the synthesis solution also comprises a calixarene of Formula I or of Formula II.

5. The insoluble and swellable nanofibres according to claim 1, wherein the nanofibres are obtained by the process further comprising the step of:
stabilizing the nanofibres by VUV or UV radiation or by visible radiation to obtain nanofibres that are insoluble and swellable in an essentially aqueous effluent.

6. The insoluble and swellable nanofibres according to claim 1, wherein the synthesis solution is a water/ethanol solution.

7. The insoluble and swellable nanofibres according to claim 1, wherein the diameter of said nanofibres is from 50 nm to 10 µm.

8. A membrane constituted by nanofibres that are insoluble but swellable in an essentially aqueous solvent according to claim 1.

9. Use of the nanofibres that are insoluble and swellable in an essentially aqueous effluent according to claim 1, or a membrane constituted by nanofibres that are insoluble but swellable in an essentially aqueous solvent, for treating an effluent containing metals.

10. The use according to claim 9, for treating an effluent containing caesium, wherein the nanofibres are obtained from an organic synthesis solution comprising:
polyacrylic acid or anionic derivatives thereof; and
a calixarene of Formula I or Formula II or a non-crosslinking calixarene.

11. The use according to claim 9, for treating an effluent containing copper, wherein said nanofibres are obtained from an aqueous solution of polyacrylic acid or of co-polymers.

12. The use according to claim 9, for treating an effluent containing uranium, wherein said nanofibres are obtained from a synthesis solution comprising the cationic derivatives of polystyrene.

13. A process of extraction from an effluent of metals, comprising the following steps:
(i) placing insoluble but swellable nanofibres according to claim 1 or a membrane according to claim 8 in an essentially aqueous effluent for a sufficient time; and
(ii) recovering the metals complexed by said nanofibres or said membrane by placing said nanofibres or said membrane in a regeneration solution.

14. The process according to claim 13, wherein said regeneration solution is an acid solution.

15. The use of nanofibres according to claim 9 or the process according to claim 13 wherein an effluent containing metals is an effluent containing metals chosen from metal salts originating from heavy metals, rare earths, alkali metals, alkaline earth metals, or actinides, in the stable or unstable isotopic forms thereof.

16. The nanofibres according to claim 1, wherein the anionic derivatives of polystyrene are chosen from polystyrene sulphonate or the copolymers of polystyrene sulphonate.

17. The nanofibres according to claim 1, wherein the cationic derivatives of polystyrene are chosen from polystyrene trialkylbenzyl ammonium.

18. The nanofibres according to claim 1, wherein $Z_1$ and $Z_2$ of the calixarene of formula I or II represents independently of each other a substituted aryl group chosen from a tosyl, a diazonium group or an aromatic heterocycle chosen from a pyrrolyl, furyl, thienyl, or pyridinyl group.

19. The nanofibres according to claim 1, wherein the hydrophilic and water-soluble initial polymer has a molecular weight from $1 \times 10^4$ to $5 \times 10^5$ and the hydrophilic and water-soluble initial polymer content in the synthesis solution is from 10 to 30 wt. %, relative to the synthesis solution.

20. The nanofibres according to claim 1, wherein the synthesis solution comprises one additive selected from:
a cross-linking agent from 1 to 40 wt. % relative to the hydrophilic and water-soluble initial polymer, or
a complexing molecule from 1 to 30 wt. % relative to the hydrophilic and water-soluble initial polymer.

21. The nanofibres according to claim 1, wherein the cross-linking agent is chosen from diazidostilbene, hexamethylenediamine, 1,4-dibromobutane, 1,4-diiodobutane, 1,4-dichlorobutane.

* * * * *